United States Patent
Clements et al.

(10) Patent No.: US 12,248,537 B2
(45) Date of Patent: Mar. 11, 2025

(54) SYSTEMS AND METHODS FOR UNIFORM USAGE RIGHTS MANAGEMENT

(71) Applicant: VendEx Solutions, Inc., San Francisco, CA (US)

(72) Inventors: Richard Fitzhugh Clements, San Francisco, CA (US); Michele Irene Kelsey, San Francisco, CA (US); Anya Milstein, San Francisco, CA (US)

(73) Assignee: VendEx Solutions, Inc., San Francisco, CA (US)

( * ) Notice: Subject to any disclaimer, the term of this patent is extended or adjusted under 35 U.S.C. 154(b) by 0 days.

(21) Appl. No.: 18/673,096

(22) Filed: May 23, 2024

(65) Prior Publication Data
US 2024/0394342 A1 Nov. 28, 2024

Related U.S. Application Data

(60) Provisional application No. 63/469,218, filed on May 26, 2023.

(51) Int. Cl.
*G06Q 20/00* (2012.01)
*G06F 21/10* (2013.01)
*G06Q 50/18* (2012.01)

(52) U.S. Cl.
CPC ........... *G06F 21/101* (2023.08); *G06Q 50/18* (2013.01)

(58) Field of Classification Search
USPC .......................... 705/16, 21, 59; 380/44, 262
See application file for complete search history.

(56) References Cited

U.S. PATENT DOCUMENTS

| | | | |
|---|---|---|---|
| 11,562,191 B1 * | 1/2023 | Pathak | G06Q 10/101 |
| 2005/0124319 A1 | 6/2005 | Williams | |
| 2007/0073734 A1 | 3/2007 | Doan | |
| 2008/0027867 A1 | 1/2008 | Forbes | |
| 2008/0320599 A1 | 12/2008 | Raley | |
| 2015/0047052 A1 | 2/2015 | Leclercq | |
| 2015/0149369 A1 | 5/2015 | Raley | |
| 2016/0203319 A1 | 7/2016 | Coen | |
| 2020/0349277 A1 | 11/2020 | Torbey | |
| 2020/0381091 A1 | 12/2020 | Granvold | |
| 2021/0209199 A1 | 7/2021 | Slavin | |
| 2021/0343401 A1 | 11/2021 | Joseph | |

(Continued)

OTHER PUBLICATIONS

"Magento extension SKU Auto Generator". MageCloud, 2017, www.magecloud.net/marketplace/extension/sku-auto-generator/.

(Continued)

*Primary Examiner* — Dante Ravetti
(74) *Attorney, Agent, or Firm* — Nixon Peabody LLP

(57) ABSTRACT

Systems and methods are disclosed for managing usage rights with a uniform code. Contract terms for licensing a property, such as a data product, can be represented as combinations of usage rights categories with associated action attributes and provision attributes. These usage rights categories, action attributes, and provision attributes can be encoded to generate a string representing the contract term (s). This string can be leveraged to readily ascertain the usage rights available or desired for a particular property, enabling streamlined management for complex contract terms across numerous properties.

11 Claims, 8 Drawing Sheets

(56) References Cited

U.S. PATENT DOCUMENTS

2022/0156235 A1   5/2022   Ly

OTHER PUBLICATIONS

"Free SKU Generator". Gorgias, Dec. 3, 2020, web.archive.org/web/20201203012926/https://www.gorgias.com/tools/sku-generator.

"Zebra Solutions Pathway". Zebra, 2020, www.zebra.com/content/dam/zebra_new_ia/en-US/corporate-and-brand/connected-commerce/guide/zsp-guide-solutions-pathway-recent-updates-en-US.pdf.

Ilic "SQL Join Types Explained". Nov. 2020 https://learnsql.com/blog/sql-joins-types-explained/.

"How can I select matching column names between multiple tables?". Stackoverflow, Sep. 2019, stackoverflow.com/questions/57812082/how-can-i-select-matching-column-names-between-multiple-tables.

International Search Report and Written Opinion issued in WO 2023/235748 dated Nov. 9, 2023.

International Search Report and Written Opinion issued in PCT/US2024/030899 dated Oct. 18, 2024.

* cited by examiner

| Action | | May Not/Must Not 00 | May 01 | May Only 02 | Must 03 | Must Only 04 | Provided 05 | Except 06 | Unless 07 | |
|---|---|---|---|---|---|---|---|---|---|---|
| Use Type | | Prohibited Uses | Permitted Uses | Permitted Uses | Required Actions | Required Actions | Required Action | Exceptions | Exception | |
| Full URC Code | | AN{nnn:01-3004,3005(bbb:07-3012)|AA{bbb:01-1127,1134(ddd:02-1190|aaa:05-1100,1103,1104(eee:05-1134(ddd:02-1140(ffff:07-1127)(ggg:00-1199,ccc:00-1104(bbb:07-1127)|AG{iii:02-YL1002(mmm:05-1157,1166#2)|jjj:00-2828,2268,2266(fff:06-2268,2266(ccc:06-1112,1111*(aaa:05-1179)|bbb:00-1130(jjj-06)} | | | | | | | |
| Category | | Permitted Use | | | | Prohibited Use | Required Action | | Exception | |
| Reporting and Auditing AN | Required Actions | | | | | | Must 01 Report data usage to Vendor | | 3004 | |
| | | | | | | | Must 01 Provide access to the Vendor for an onsite audit | | 3005 Unless 07 Vendor waves this reqmt. in writing | 3012 |
| URC Code | | AN{nnn:01-3004,3005(bbb:07-3012)} | | | | | | | | |
| Derivative Works AA | Required Actions | | | | | | Must 01 Have required licensing in place to create specific deriv. works | | 1127 | |
| | | | | | | | Must 01 Sign an agreement with the T&Cs of the Vendor | | 1134 | |
| | Permitted Uses | | May 02 Create analytical models | 1190 | May Not/ Must Not Create analytical models w/o source attribution | | Provided 05 With Source Attribution | | 1100 | |
| | | | | | May Not/ Must Not Create analytical models w/o logo display or with modifications to logo | | Provided 05 Display logo without modification | | 1103 | |
| | | | | | May Not/ Must Not Create analytical models w/o written permission from Vendor | | Provided 05 With written permission from Vendor | | 1101 | |
| | | | May 02 Create Watchlists | 1140 | May Not/ Must Not Create analytical models w/o a written agrmt. with T&Cs of Vendor | | Provided 05 Sign an agreement with the T&Cs of the Vendor | | 1134 | |
| | | | | | May Not/ Must Not Create watchlists in the absence of identifiers without addl lic. in place | | Provided 05 identifiers are provided for data mapping | | 1145 Unless 07 | In the absnc. of idntfrs. have addl lic. in place 1173, 1127 |
| | Prohibited Uses | May Not/ Must Not Build prds. that do not compt. w/ V. offrngs. | | | | 00 Build a competitive offering | | | | 1199 |
| | | May Only 02 Use data for deriv. works that are exprsly permtd. in contract | | | | 00 Use data for deriv. works not specified in contract | | | Unless 07 Additional lic. is in place | 1104 1127 |
| URC Code | | AA{bbb:01-1127,1134(ddd:02-1190|aaa:05-1100,1103,1104(eee:05-1134(ddd:02-1140(ffff:07-1127)(ggg:00-1199,ccc:00-1104(bbb:07-1127)} | | | | | | | | |
| Publishing AG | Permitted Uses | May Only 02 Content may only be publd. to Acme1, the firm's propty. platform YL1002 | | | | May Not/ Must Not Content may not be published anywhere other than Acme 1, the firm's proprietary platform | | Provided 05 All content is published with a two-day delay | | 1157 1166#2 | |
| | | May 02 Content may be publ. outside of China, Greece and Germany | | | | May Not/ Must Not Publish in China, Greece, Germany | | Provided 05 If published in Greece and Germany for regul. Compliance & Legal investig., must provide disclosure to Vendor | | 2828, 2268, 2266 Except 06 | In the case of Greece & Germany, for Legal investig. & regul. Compliance 2268, 2266, 1112, 1111 |
| | Prohibited Uses | May 00 Only publ. extly. occly. on an ad hoc basis | | | | May Not/ Must Not 00 Publish externally | | | | 1130 Except 06 | Ad hoc occasional content 1116 |
| URC Code | | AG{iii:02-YL1002(mmm:05-1157,1166#2)|jjj:00-2828,2268,2266(fff:06-2268,2266(ccc:06-1112,1111*(aaa:05-1179)|bbb:00-1130(jjj-06)} | | | | | | | | |

FIG. 3

SYSTEMS AND METHODS FOR UNIFORM USAGE RIGHTS MANAGEMENT

CROSS-REFERENCE TO RELATED APPLICATIONS

This patent application claims the benefit of and priority to U.S. Provisional Application No. 63/469,218, filed May 26, 2023, which is hereby incorporated by reference herein in its entirety.

TECHNICAL FIELD

The present disclosure relates to rights management platforms generally and more specifically to uniform usage rights management via uniform encoding.

BACKGROUND

Usage rights describe how data or other properties can be stored, distributed, redistributed, published, copied, used for derivative works, and otherwise used. Usage rights can exist in various types of properties across various industries, such as music, broadcasting (e.g., television), movies, financial services, legal services, accounting services, and the like.

A property owner, or other rightsholder, when permitted, can license usage rights out to others. As the ability to leverage data and other properties in new ways continues to expand, the granularity and complexity with which a property owner or other rights grantor wishes to license out the usage rights can substantially increase. For example, a data product (e.g., stock market data) may be licensed with varying amounts of granularity, such as a license granting permission to access and distribute, with at least a 15-minute delay and only in particular geographic regions, the data product starting on a start date and ending on an end date. As another example, usage rights for a movie may be granted to permit a licensee to present the movie in certain geographic territories as long as a minimum ticket fee is charged and royalties paid, and to redistribute the movie in only certain data formats.

Keeping track of complex licenses can present challenges for both grantors and grantees alike. Grantors may want to ensure that only certain rights are granted, ensure that the grantees are using the rights properly, and ensure that the grantees are properly paying for the usage rights. Grantees may want to ensure they have acquired the correct rights for their purposes and ensure that they are not unnecessarily paying for rights they do not need. For example, a service provider may have a license to make use of a certain type of financial data product in a certain country, but during a recent audit, they discovered by chance that their license rights to that financial data include rights to use the financial data in multiple countries. In this example, the service provider may be paying for more usage rights than necessary, which was only discovered by chance.

Especially in cases where large volumes of products are being licensed with varying degrees of granularity, it can become very expensive in both time and money to manage license rights. Keeping track of such usage rights can involve keeping track of many individual contracts, each with their own terms, requirements, expiration dates, and other factors. It can also be difficult for an entity to determine whether or not it has particular usage rights, as it may need to delve deeply into many individual contracts to identify all permissions and restrictions associated with a particular product. Further, when products from different industries are considered, existing approaches for managing usage rights in one industry may be impractical for managing usage rights in another industry, thus further complicating the ability for a universal solution.

Further, as terminology and contract templates differ between different entities and across different industries, it can be extremely difficult and costly, if not impractical, to compare and contrast contract terms between different contracts.

There is a need for an improved rights management platform capable of solving these and other problems. There is a need for a universal rights management platform. There is a need for a rights management platform that makes use of a uniform taxonomy to represent and manage usage rights. There is a need for a rights management platform that is industry-agnostic.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, supplemented by this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

Embodiments of the present disclosure include a method comprising receiving usage rights information associated with a property. The usage rights information includes one or more usage rights terms. Each of the one or more usage rights terms is indicative of a permission or restriction associated with the property. The method further comprises determining, for each of the one or more usage rights terms, i) a use category, ii) an action attribute associated with the use category, and iii) a provision attribute associated with the use category and the action attribute. The use category, the action attribute, and the provision attribute together represent at least a portion of the respective permission or restriction associated with the respective usage right term. The method further comprises identifying, for each of the determined usage rights categories, an alphanumeric category code. The method further comprises identifying, for each of the determined action attributes, an alphanumeric action attribute code. The method further comprises identifying, for each of the determined provision attributes, an alphanumeric provision attribute code. The method further comprises generating one or more substring codes based at least in part on the one or more alphanumeric category codes, the one or more alphanumeric action attribute codes, and the one or more alphanumeric provision attribute codes. The method further comprises generating a usage rights code (URC) for the property based at least in part on each of the one or more substring codes. The URC is representative of the one or more usage rights terms.

Embodiments of the present disclosure include a method comprising receiving, by a computing device, a request to access a property. The request to access the property involves one or more necessary rights. The method further comprises receiving a usage rights code (URC) associated with the request to access the property. The URC is an alphanumeric code indicative of one or more usage right terms. The one or more usage rights terms is represented (in the URC) by a combination of one or more alphanumeric category codes, one or more alphanumeric action attribute codes, and one or more alphanumeric provision attribute codes. The method further comprises determining that the one or more necessary rights are satisfied by the one or more usage rights terms based at least in part on the combination of the one or more alphanumeric category codes, the one or more alphanumeric action attribute codes, and the one or more alphanumeric provision attribute codes. The method further comprises authorizing access to the property in response to determining that the one or more necessary rights are satisfied.

Embodiments of the present disclosure include a system. The system comprises one or more data processors. The system further comprises a non-transitory computer-readable storage medium containing instructions which, when executed on the one or more data processors, cause the one or more data processors to perform the method(s) described above.

Embodiments of the present disclosure include a computer-program product tangibly embodied in a non-transitory machine-readable storage medium, including instructions configured to cause a data processing apparatus to perform the method(s) described above.

BRIEF DESCRIPTION OF THE DRAWINGS

The specification makes reference to the following appended figures, in which use of like reference numerals in different figures is intended to illustrate like or analogous components.

FIG. 3 is a chart depicting an example usage rights code and its associated terms, according to certain aspects of the present disclosure.

DETAILED DESCRIPTION

Figure 1:
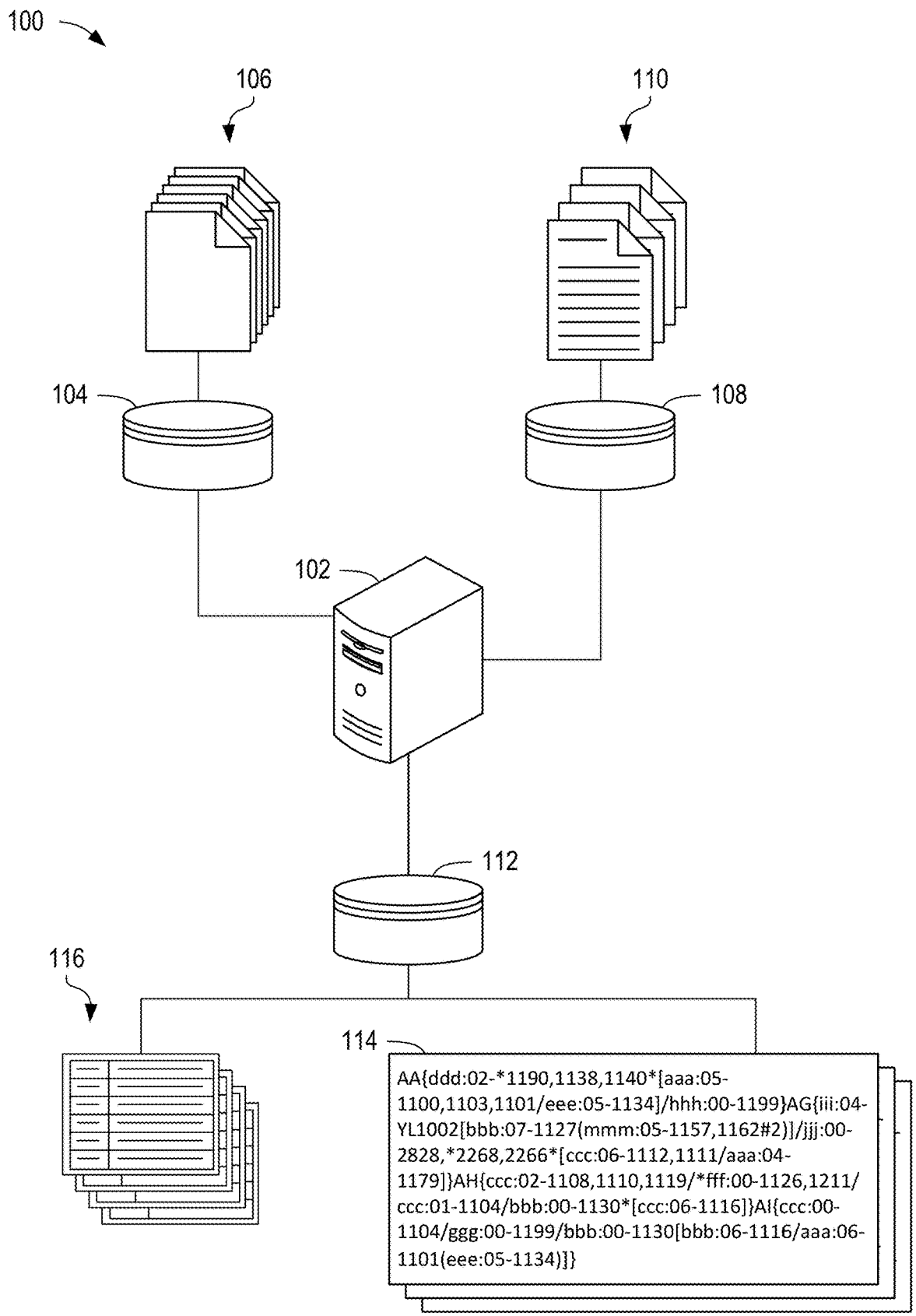
FIG. 1 is a schematic diagram depicting an environment for uniform usage rights management, according to certain aspects of the present disclosure.

Certain aspects and features of the present disclosure relate to systems and methods for managing usage rights with a uniform code. Contract terms for licensing a property, such as a data product, can be represented as combinations of usage rights categories with associated action attributes and provision attributes. These usage rights categories, action attributes, and provision attributes can be encoded to generate a string representing the contract term(s). This string can be leveraged to readily ascertain the usage rights available or desired for a particular property, enabling streamlined management for complex contract terms across numerous properties.

Properties, such as digital properties or computer-accessible properties, can be exploited by transferring or licensing various rights associated with the property. For example, a vendor collecting and organizing information about sporting events may provide various data products that buyers desire to access and leverage for their own purposes. The vendor can license a data product to different buyers, each with the same or different contract terms. In this example, a first buyer may wish to redistribute the data as part of a podcast, in which case the vendor may license the data product to the first buyer at a first price and with a first set of contract terms. A second buyer may wish to use the data to train an artificial intelligence model that would then be sold as a service to downstream users, in which case the vendor may license the same data product to the second buyer at a second price and with a second set of contract terms. Keeping track of the various contract terms across many licenses, many vendors, many buyers, and many data products can be an extremely difficult task. Attempting to keep track of this information manually may be impractical, especially when there is a desire to license usage rights with different degrees of granularity.

As used herein, the term property is intended to include any suitable exploitable property, such as a data product. For illustrative purposes, various examples presented herein are described with reference to data or a data product, although such examples can be used or modified, as appropriate, for other properties. Certain aspects of the present disclosure are especially useful for property that is computer-accessible, as automated functions described herein can facilitate automatically or semi-automatically managing the usage rights for these computer-accessible properties. Properties can be associated with various industries, such as music, broadcasting, movies, financial services, legal services, accounting services, and any other industry sectors requiring identification and tracking of contractual data and how it may be used.

As used herein, the term usage rights is intended to include permissions or restrictions associated with a property. Usage rights can be granted by a grantor or rights-owner, which is generally the property owner. Usage rights can be granted via a contract, such as a license. The usage rights can be granted to a grantee (e.g., a licensee or other consumer). The contract can include multiple terms, each of which describes a particular permission or restriction associated with the contract. For example, a grantor may license a data product to a licensee with permission to use the data product for any purpose, but with a restriction to limit the license to only a particular geographic region and a particular time period.

Many types of usage rights can be used. In some cases, possible usage rights can be split into usage rights categories, which can include categories such as storage, distribution, redistribution, publication, copying, creation of derivative works, intellectual property rules, displaying data, and the like.

As disclosed in further detail herein, one or more contract terms can be represented in an encoded format as a string of alphanumeric characters, optionally including additional symbols to logically organize the alphanumeric characters.

As contract terms can be extremely granular in nature, especially with respect to data products, the encoded format disclosed herein organizes terms into components that can improve the ability to normalize, understand, search for, and compare usage rights. The string of alphanumeric characters encoding a collection of one or more contract terms (e.g., all terms for a given contract) can be referred to as a Usage Rights Code (URC). The URC schema can be industry agnostic, allowing contract terms in many different industries to be represented in a uniform manner that can be accessed and leveraged programmatically.

Vendors can make use of URCs to clearly define what rights are being granted for a given property and what restrictions are in place. In some cases, license fees or costs can be tied to different contract terms, thus allowing license fees or costs to be automatically calculated based on a URC. Likewise, consumers can make use of URCs to confirm the rights they have for a given property and ensure they are complying with any restrictions. As URCs are uniform in nature, the use of URCs to identify contract terms for a property can ensure the vendors and consumers clearly understand the desires and expectations of the other party, avoiding conflict arising from unclear contract language.

A URC can be comprised of a series of alphanumeric characters and symbols codifying contractual terms, specifying precisely how data and services of a given product may or may not be used. A URC can be formed of components, such as usage rights categories, action attributes, and provision attributes. Each of the components can be stored, with associated codes, in one or more data tables. In some cases, some data tables can vary between different industries, however, the overall structure of the URC may remain constant between industries.

A URC can be structured in any suitable fashion, although it has been determined to be beneficial to structure URCs as a combination of substrings, each of which is associated with a given grouping of contract terms. Such groupings of contract terms can be associated with particular usage rights categories. A usage rights category is a particular type of usage rights. Each usage rights category can be associated with a usage rights category code. For example, a category of "Redistribution" may have a code of "AC."

Within a substring, one or more action attributes and associated provision attribute(s) can be provided to establish a contract term. An action attribute is a selected action for how the associated provision attribute(s) should be treated. In other words, the action attribute specifies whether an associated provision attribute is a permission, a prohibition, a requirement, or an exception. Examples of action attributes include i) "may not/must not," ii) "must," iii) "may," iv) "must only," v) "may only," vi) "provided," vii) "except," and viii) "unless." In some cases, other action attributes can be used. Each action attribute can be associated with an action attribute code. For example, the action attribute code for "may" could be "02."

A provision attribute is a subject or object of the action attribute that is used to define the underlying aspect of a contract term. In other words, the provision attribute is the underlying term content that is affected by the action attribute. Many provision attributes may exist, including both global provision attributes (e.g., industry-agnostic provision attributes) and industry-specific provision attributes. Each provision attribute can be associated with a provision attribute code. In some cases, provision attributes can be logically grouped into tables. Each table can contain a listing of similar provision attributes. For example, a table of "attribution requirements" may contain provision attributes such as "with source attribution" and "with notification to vendor." In some cases, a table code can be used to represent a given table of provision attributes. In some cases, a provision attribute code can be prefixed with a table code. The table code can act as a pointer to a selected grouping (e.g., table) of provision attribute codes. In some cases, multiple provision attribute codes within a single table can be represented by being grouped together with a single instance of the appropriate table code. In the above example, the table of "attribution requirements" may have a table code of "aaa" and the "with source attribution" and "with notification to vendor" provision attributes may have provision attribute codes "1100" and "1179." In such an example, a contract term that requires source attribution and notification to a vendor may be represented as "aaa:05-1100, 1179: where "05" represents the "provided" action attribute. This representation can be read as " . . . , within the attribution requirements table, provided that source attribution is provided and notification to the vendor is provided . . . " Such contract terms can be a restriction that is added to another contract term (e.g., granting of a right to make derivative works).

Category, the first component of the URC, defines the type of data usage, (e.g., derivative works creation, display, redistribution, data retention, storage, and other types of usage). Categories can be defined by an alphanumeric code, such as a code containing two capital letters. The categories used may be fairly universal and applicable to multiple industries. The length and composition of the code may change as required based on the number of categories and provision attributes within a given industry and contract.

In some cases, a special case category known as "Undefined" can be used to indicate elements for which the contract is silent. In other words, the ability to use an undefined category code (e.g., "ZZ") allows action attributes and provision attributes to be incorporated into a URC despite not being associated with an existing category.

Table 1 depicts an example usage rights category table.

TABLE 1

| Category | Category Code |
| --- | --- |
| Derivative Works | AA |
| Display | AB |
| Redistribution | AC |
| Dissemination | AD |
| Integration | AE |
| Storage | AF |
| Publishing | AG |
| Raw Data Usage | AH |
| Intellectual Property | AI |
| Data Retention (during contract) | AJ |
| Data Retention (post termination) | AK |
| Copying | AL |
| Reverse Engineering | AM |
| . . . | |
| Undefined | ZZ |

Action attributes specify the permissions, prohibitions, requirements, and exceptions of contract language using actions such as "May Not/Must Not," "Must," "May," "Must Only," "May Only," "Provided," "Except," and "Unless." The action attributes distill complex contracts into their most basic elements in terms of permissions and prohibitions ("May Not/Must Not," "Must," "May," "Must Only," "May Only") as well as requirements and exceptions ("Provided,"

"Except," "Unless") for each. Through nontrivial trial and examination, it has been determined that the aforementioned example action attributes cover all necessary conditional logic for contract terms.

Putting the action attributes and the usage right categories, one can start to form logical strings, such as "User May Not/Must Not (code 00) create Derivative Works (code AA)."

Table 2 depicts an example action attribute table.

TABLE 2

| Action | Action Code |
|---|---|
| May Not/Must Not | 00 |
| Must | 01 |
| May | 02 |
| Must Only | 03 |
| May Only | 04 |
| Provided | 05 |
| Except | 06 |
| Unless | 07 |

As described in further detail herein, table codes (e.g., a three lowercase letter code) can be used to identify groupings (e.g., tables) of provision attributes. In some cases, the groupings of provision attributes can be already stored within an organization, allowing it to be reused as desired. Leveraging existing tables within an organization is a sound best practice. Firms will often have tables that power multiple applications, such as "geography," "languages," "vendors," and "products." Other tables, such as "publishing rules," "derived works," and "other datasets" specific to usage rights can be created in the event that they do not exist elsewhere.

Building on the earlier logical string: "User may not (code 00) create indices using this data" would be coded: May Not/Must Not (Action Code 00); Create indices (Table Index ddd—Derivative Works, Provision Attribute Code-Indices (1138). The Table Index directs the information string to the Derivative Works table via the table code ddd, and creates machine readable logic that says "go to provision attribute table ddd (Derivative Works) which includes the provision attribute code for Indices (1138).

Table 3 depicts an example table index.

TABLE 3

| Table Name | Table Code |
|---|---|
| Attribution Requirements | aaa |
| Licensing and Permissioning Requirements | bbb |
| Business Purpose | ccc |
| Derivative Works | ddd |
| Redistribution Terms | eee |
| Integration and Data Storage | fff |
| Intellectual Property Rights | ggg |
| Vendor Permitted/Prohibited/Restrictions | hhh |
| Product Permitted/Prohibited/Restrictions | iii |
| Geography | jjj |
| Limit Parameters | mmm |
| ... | ... |

The provision attributes impart specific information on various elements of data usage. All of the tables, working together, may be formed into strings which precisely define data usage rights.

Building more granularity into the previous example: "User may not (code 00) create indices using this data unless the Vendor provides permission in writing, provided the data source is clearly referenced" would be coded: May Not/Must Not (Action Code 00) Create indices (Table Index ddd—Derivative Works, Provision Attribute Code—Indices—1138) Unless (07) Vendor provides permission in writing (Table Index aaa, Provision Attribute Code 1101) Provided (Action Code 05) data source is clearly referenced (Table Index aaa, Provision Attribute Code-Source Attribution—1100).

Tables 4, 5, 6, 7, 8, and 9 depict example provision attribute tables for "Attribution Requirements," "Business Purpose," "Derivative Works," "Redistribution Terms," "Vendor Permitted/Prohibited/Restricted," and "Product Permitted/Prohibited/Restricted."

TABLE 4

| Provision Attribute | Provision Attribute Code |
|---|---|
| With source attribution | 1100 |
| With written permission from vendor | 1101 |
| Without modifications to content | 1102 |
| Without modifications to logos, trademarks and vendor notices | 1103 |
| With notification to vendor | 1179 |
| Not required for limited ad hoc distribution | 1177 |
| Use vendor or product name in marketing materials | 1178 |
| ... | ... |

TABLE 5

| Provision Attribute | Provision Attribute Code |
|---|---|
| Business purposes not specified in contract | 1104 |
| Products not specified in contract | 1181 |
| Analytics system | 1105 |
| Automated order generation | 1106 |
| Automated trading system | 1107 |
| Company engagement | 1108 |
| Compliance system | 1109 |
| Due diligence | 1110 |
| Legal investigation | 1111 |
| Regulatory compliance | 1112 |
| Fund administration | 1113 |
| Internal compliance | 1114 |
| Legal compliance | 1115 |
| Limited content to support business activities | 1116 |
| Order management | 1117 |
| Portfolio management | 1118 |
| Portfolio monitoring | 1119 |
| Portfolio screening | 1120 |
| Risk management | 1122 |
| Trading system | 1123 |
| Verification processes | 1124 |
| ... | ... |

TABLE 6

| Provision Attribute | Provision Attribute Code |
|---|---|
| Trading models | 1136 |
| Analytical models | 1190 |
| Benchmarks | 1137 |
| Blended benchmarks | 1191 |
| Indices | 1138 |
| Limit order Pegging | 1139 |
| Net asset value (NAV) | 1192 |

TABLE 6-continued

| Provision Attribute | Provision Attribute Code |
|---|---|
| Portfolio performance calculations (excluding NAV) | 1193 |
| Pricing | 1194 |
| Price valuation | 1195 |
| Watchlist creation | 1140 |
| Portfolio risk analysis | 1196 |
| Portfolio valuation | 1197 |
| Comparative analysis | 1198 |
| ... | ... |

TABLE 7

| Provision Attribute | Provision Attribute Code |
|---|---|
| Third party agreement to be bound by IP terms | 1134 |
| Licensee subject to the same use rights defined by original licensor | 1180 |
| Must duplicate unaltered copies of all proprietary notices provided with any redistributed items | 1187 |
| Licensee is responsible for data backup | 1182 |
| Not responsible for protection, loss, destruction of data due to errors caused by customizations | 1183 |
| Not responsible for nonperformance due to failure to use latest content | 1184 |
| May redistribute ad hoc in limited amounts | 1185 |
| May not sell to specified vendor | 1186 |
| ... | ... |

TABLE 8

| Provision Attribute | Provision Attribute Code |
|---|---|
| Acme Data East | ZX397 |
| WCI Systems | TN395 |
| Morton Bennett AI | XC283 |
| Algomatrix, Inc | UL370 |
| BPD Factors | QU389 |
| Cervantes Solutions | VL340 |
| IZLI Analytics | XR530 |
| Atlantica Smartworks | ZQ309 |
| ... | ... |

TABLE 9

| Provision Attribute | Provision Attribute Code |
|---|---|
| ADE Portfolio Monitoring | YL1002 |
| Infrastructure Plus | UZ9549 |
| Bennett Extract Plus | PR2840 |
| Algodefine | XY3929 |
| Factor Plus | ZZ9283 |
| Pod Master | YM3929 |
| IZLI Small Cap Index | XR0358 |
| Smartworker Professional | XP4931 |
| ... | ... |

Action attribute codes, table index codes, and provisional attribute codes may be used multiple times within a Usage Rights Category, with the underlying tables being identical for each instance. Thus, the ability to denote permissions for a given category at the most granular level is achieved.

Further, usage rights may be nested within one another—in some cases up to four levels, although that need not always be the case—by using the same action attribute codes, table index codes, and provisional attribute codes.

The format of code that has been designed to represent data usage rights codes to improve machine readability follows a specific and consistent format—the symbology and order of operatives may change as additional layers are added, or as business warrants. Additionally, they may be adjusted as appropriate for different industries.

In an example, each of the codes may be repeated up to four times, using the symbology {[(< >)]} to create a string that nests restrictions and qualifiers within a given permission.

Table 10 depicts an example set of symbols used for organizing URC data to group together data usage rights and their related permitted/prohibited/requirements/provisions.

TABLE 10

| Description | Symbol | Meaning |
|---|---|---|
| Alphanumeric Upper Case | AA | Category |
| Braces | { | Start of Action |
| Braces | } | End of Action |
| Brackets | [ | Start of First Provision/Exception Action |
| Brackets | ] | End of First Provision/Exception Action |
| Parentheses | ( | Start of Second Provision/Exception Action |
| Parentheses | ) | End of Second Provision/Exception Action |
| Less than | < | Start of Third Provision/Exception Action |
| Greater than | > | End of Third Provision/Exception Action |
| Alphanumeric Lower Case | bbb | Table Code |
| Colon | : | Separation between table code and Action/Exception/Provision |
| Dash | - | Separation between Action/Exception/Provision and Action Definition or Provision/Exception Action |
| Comma | , | Divider of different entries of equal footing from the same table |
| Forward slash | / | Change to another table of equal footing from different tables |
| Asterisk | * | Denotes groups included within a string-indicates which prior strings are referred to by the next provision |
| Hashtag | # | Denotes an actual number, percentage or other quantity in a time/constraint field; format is # followed by numeric value |

While the URC may be implemented in different suitable formats, examples herein use the following format: Category{TableCode:ActionAttributeCode—ProvisionAttributeCode/TableCode: ActionAttributeCode—ProvisionAttributeCode[TableCode:ActionAttributeCode —ProvisionAttributeCode (TableCode:ActionAttributeCode—ProvisionAttributeCode<TableCode:ActionAttributeCode-ProvisionAttributeCode>)]}.

In an example, the following contract terms: "Client may not use the data under this agreement for any activity that is not the defined Business Purpose or use the data, visualization or other product features to build a competitive product. Data may not be shared with any users not licensed specifically for this data, excepting i) where Client may share occasional ad hoc selections internally and in line with licensed business purposes and ii) instances where the Vendor permits broader sharing in writing, provided that any third party will agree to be bound by the same contractual rights as the Client." could be coded as "AI{ccc:00-1104/ggg:00-1199/bbb:00-1130[bbb:06-1116/aaa:06-1101(ccc: 05-1134)]}".

In some cases, contract terms can be automatically extracted from a contract to create a URC for the contract, although that need not always be the case. In some cases, contract terms can be manually extracted from a contract and then used to automatically generate a URC for the contract. Regardless of whether a URC is created through fully automatic, semi-automatic, or even fully manual techniques, the URC can then be leveraged as disclosed in further detail herein.

In some cases, a synonym dictionary (e.g., synonym database) can be used to ensure consistent contract term extraction despite differences in drafting language. In some cases, the synonym dictionary can be prepopulated and/or updated by user interaction (e.g., during a semi-automated extraction of contract terms or upon reviewing automatically extracted contract terms). Any suitable synonyms can be used in the synonym dictionary. As an example, the term "acquisition" can have the synonyms "purchase," "acquire," and "takeover." As another example, the term "amendment" can have the synonyms "amendment and restatement," and "restatement." As another example, the term "business units" can have the synonyms "departments," "groups," and "sites." As another example, the term "constraints" can have the synonyms "qualifications," "caveats," and "limitations." As another example, the term "except" can have the synonyms "other than," "excluding," "omitting," "leave out," "disregard," "bar," "barring," "excepting," "except for," "exempt," "exempting," "minus," "with the exception of," and "without." As another example, the term "historical data" can have the synonyms "rolling history," "history," "back data," and "data history." As another example, the term "licensed user" can have the synonyms "licensee," "authorised user," "authorized user," and "permitted individual." As another example, the term "master agreement" can have the synonyms "main agreement," "framework agreement," "master contract," "master services agreement," "master service agreement," "primary agreement," "MSA," "main agreement," "primary agreement," and "master contract." As another example, the term "merger" can have the synonyms "amalgamation," "merger of equals," "joint organization," "combination," "combine," "merge," "takeover," and "stock purchase." As another example, the term "may/must" can have the synonyms "be obliged to," "be under an obligation to," "have to," "imperative," "mandatory," "may, need to," "obligated to," "obligation," "obligatory," "required," "requirement," "requisite," "permitted," and "allowed." As another example, the term "may not/must not" can have the synonyms "may not," "must not," "shall not," "will not," "can not," "prohibited," "restricted," "cease," "cannot," "do not," "unauthorized," "not allowed," and "disallowed." As another example, the term "permitted" can have the synonyms "allowed" and "may." As another example, the term "prohibited" can have the synonyms "not allowed," "can not," and "must not." As another example, the term "real time data" can have the synonyms "low latency data" and "ultra low latency data." As another example, the term "purchase order" can have the synonyms "purchase order to master agreement," "addendum," "order form," "exhibit," "contract exhibit," "SOW," "statement of work," and "subscription form." As another example, the term "subsidiaries" can have the synonyms "affiliates," "acquisitions, entities that licensee may purchase, wholly owned subsidiary, and wholly owned subsidiaries. As another example, the term "third party use" can have the synonym "third party licensing." As another example, the term "unless" can have the synonyms "save for," "but," "without," and "except when." As another example, the term "may only" can have the synonyms "only permitted," "only allowed," and "as an only option."

Generally, a URC can be logically broken down into permitted uses, prohibited uses, exceptions, and required actions. In some cases, a URC can present these components in a known order, such as the order presented above, although that need not always be the case. As part of the logic of a URC, an action attribute can be added to a prohibited use to turn it into a permitted use, and vice versa. In the example terms "this data May Not/Must Not be published except to the group responsible for Know Your Customer (KYC) activities within the organization," the "may not/must not" action attribute initially presents the term as a prohibited use (e.g., may not publish the property), but the subsequent action attribute "except" renders the term as a permitted use as long as the exception is fulfilled (e.g., may publish the property for KYC activities within the organization). These same terms can be presented in other logical fashions, such as "this data May Only be published to the group responsible for Know Your Customer (KYC) activities within the organization."

Thus, while a contract term might often start with May Not/Must Not (e.g., a prohibited use), an exception (e.g., in the form of Except or Unless) and a resultant required action may turn this prohibited use into a permitted use (e.g., a May or a May Only) by excluding certain data sets or other permissions. Similarly, a May, May Only, Must, or Must Only term may turn into a prohibited action, unless certain required actions (e.g., "Provided" actions) are met. This organization and display logic for a URC can serve to distill the contract language for the end user to readily discover what may or may not be done with the data in simplest of terms.

URCs can be used across many different industries to achieve various benefits, such as those described herein.

In an example, URCs can be used to manage usage rights of data products. The creation of data catalogs, for both internal and external users, has become increasingly prevalent. Vendors and consumers alike benefit from transparency in the ability to access data and see exactly what is available. That said, the inventory of data and products, and their capabilities, can benefit from a centralized set of codes that readily identify precisely how the data may and may not be used.

Often, an organization's internal users ask questions such as "May I do this with the data?" Rather than open and read individual documents, searching for a particular section for a specific right (e.g. may we create derivative works?) the URC allows all parties to create, maintain, and monitor data usage permissions, prohibitions, and restrictions. The use of URCs not only saves time, but also reduces the likelihood of misinterpretation and other types of human error, as well as mitigates the penalties that may result from unlicensed use of data.

In another example, URCs can be used to manage usage rights associated with data usage generally. Data contracts, in any form and industry, are invariably linked with specific contractual usage terms. URCs can be utilized for linking discrete data and services to their contractual data usage rights. Data consumers can readily identify what can be done with the data. A firm buying data which they intend to use for an explicit purpose, for example music redistribution, or to support front office trade decisions, may decide that they would like to create and publish a set of metrics using this data. Typically, the intention to create and publish any derivative work would be disclosed and discussed upfront; in any case, using the URC codes within a system, the consumer can verify whether or not this use case is allowed under the current contract and prepare for discussions with the data provider.

In another example, URCs can be used to manage usage rights associated with data redistribution. In any industry, the terms under which content may be redistributed benefit from being understood clearly. In the music industry, for example, copying and redistribution without the proper licenses and commercial terms can result in a number of consequences, including fines, back charges, and possibly litigation. The use of URCs to digitize contractual limitations, exceptions, requirements, and other provisions, can provide an invaluable tool to mitigate this risk.

The healthcare industry faces a similar challenge, which is compounded by the high legal risk associated with confidential data. Therefore, specific contract terms surround how the data may be used, and under what circumstances, if any, the data may be shared with third parties. Other industries, such as financial services, also benefit from specific contractual and commercial terms.

In another example, URCs can be beneficial to negotiations. The URC can be applied to contract negotiations in a number of ways. Knowing exactly what can and cannot be done with the content can help to identify gaps, revenue opportunities from the vendor side, and cost savings from the consumer side. In many ways, a data usage right is an option, which implies a cost. Should the consumer have a requirement that the data needs to be used in a certain way, there is a cost associated with this desired use from the vendor point of view. Similarly, if the consumer does not need a type of data usage stated in the contract, it is an opportunity to negotiate this extra term, remove this extra term from the contract, and achieve cost savings.

Another area where the URC is beneficial is in identifying comparables. There may be contracts with other vendors where specific clauses or usage rights are used. This library of data usage rights can serve as a source of intelligence, both to the consumer and to the vendor, to implement best practices and prompt for the application of appropriate language across their contract portfolios.

Another area where the URC is beneficial is in sourcing property or other assets, including data. During sourcing, data consumers will typically check which capabilities and datasets they currently have in-house before seeking new data. For example, law firms rely on data for identifying precedent court cases, due diligence, patent data, and, depending on the branch of law, specific subject matter datasets related to their area of practice. It is not enough to check which data is in their portfolio; it is beneficial that they also understand how the data may or may not be used.

Data consumers, such as law firms, insurance companies, financial firms and others, benefit during sourcing as they can utilize the technology in the URC to confirm permitted and prohibited uses and compare them to the uses of other products or services they may already have in-house. Certain vendors may not allow redistribution or derivative works, for example, while others will. Thus, data consumers can seek out the usage terms they need and make sourcing decisions accordingly.

Another area where the URC is beneficial is in duplication identification. By using an automated and standardized coding method as disclosed herein to examine not only the products and services purchased, but also the specific permitted and prohibited uses of data and other constraints, consumers can readily see overlaps for cost rationalization. Having a license to very similar data sets from two or more vendors should not be considered overlap unless the data in these sets may be used in the same ways. If one vendor allows for publishing and derivative works and another does not, and will not, but allows for business uses that the first vendor does not, these cannot be deemed comparable and redundant. The URC can provide a valuable tool for contract structuring, cost rationalization, and reduction. The use of URCs can allow different sets of usage rights to be quickly, easily, and automatically compared to determine whether the different sets of usage rights are duplicative or not.

Another area where the URC is beneficial is in audits and usage statements. Benefiting both vendor and consumer, the URC can be linked to specific audit requirements as well as usage statements of data as contractually required by certain vendors. The URC can eliminate any confusion as the URC defines specific and discrete use cases for how data, information, and technology solutions may be used, and creates a common language for auditors and other business users to clearly understand and expedite the process.

Another area where the URC is beneficial is in geographic permissions and restrictions. There are cases where certain data sets or content are either restricted to or prohibited from certain countries or geographies. Consumers benefit from the ability to identify permitted and prohibited uses by geography. This ability allows for the vendor community to catalog and advertise the specific use cases of their data sets and/or services to the markets with precision, and more importantly, to implement them only in the permitted regions. In some cases, this ability can help avoid contractual or regulatory penalties that may result from noncompliance with appropriate restrictions.

Another area where the URC is beneficial is in requests for information (RFIs) or requests for proposal (RFPs). During the RFI/RFP process, the URC provides data consumers with the ability to readily see what they may pass along to the ultimate client. For example, a data aggregator responding to an RFI/RFP can ascertain whether the vendor requires a contract directly with the client and exactly how the client may use the data. This use of URCs protects the consumer responding to the RFI/RFP, as they are not over-promising and disclosing required rules of engagement upfront. This use of URCs also ensures that if additional permissions are required to pass on this data, they can be secured before responding.

Another area where the URC is beneficial is in risk and compliance. As more and more regulators are requesting that firms track the data they consume, it is important that data consumers are aware of, and adhere to, the actual permitted and prohibited use cases for such data. The use of URCs can help accomplish this task effectively by enabling the implementation of tools to track contractual information in such a way that it is readily available.

Another area where the URC is beneficial is in third party risk. Often, if data is to be redistributed from a data consumer to a third party, the vendor will require that downstream consumers sign an agreement and report usage. This practice is evident in many industries; in the music industry, for example, redistribution and protection of rights surrounding artists and music creation require not only contractual language for the right to share, but how and with whom the data will be shared and used. The URC can facilitate tracking and monitoring these requirements, supporting the fulfillment of compliance requirements.

Another area where the URC is beneficial is in regulation. Regulation has become increasingly pronounced over the last decade, and in most industries, will increase with the evolution of disruptive technology, as well as in the wake of financial downturns.

In the capital markets sector, there are over 70 global regulations in effect and more in the pipeline. In many countries, financial regulations call for best execution reporting. The U.S. mortgage industry has become increasingly regulated following the creation of the Consumer Financial Protection Bureau following the 2008 mortgage crisis. eHealth has also seen increased regulation and legal attention surrounding technology advances, privacy and security, and telehealth visits.

All of these examples, across industries, benefit from precision in tracking how the data may be shared, and under what circumstances. The URC can be used to identify available data, and under the terms of the contract, whether the data may be used to address or satisfy regulatory requirements.

Another area where the URC is beneficial is in digitizing industries. Applying the URC across different, discrete industries supports the ability to digitize usage rights information. In many industries, usage rights management is currently handled manually, which can significantly limit the types and volume of contracts that can be made, is subject to user error, and cannot be readily integrated into automated systems. The digitization afforded by using URCs enables organizations to streamline workflows and have a full and detailed view of what is permitted and prohibited in their product and portfolios, as well as related actions, restrictions, and exceptions.

Another area where the URC is beneficial is in contracts and licensing. With a centralized URC, consumers benefit from having a single "golden source" or master record of information for their contractual usage terms. In some cases, the use of URCs enables a direct correlation and catalog of the products and associated usage rights for contractual terms. It also benefits both vendor and consumer as it not only identifies the discrete usage rights in the contract, but such rights can be applied with specificity to each product.

Additionally, as services can be transacted with certain licensing and usage rights for specific individuals and use cases, the URC combined with product specificity can be assigned to users and user groups as per the contractual terms.

Further, digitizing the usage rights that are applied to contracts can eliminate the confusion over differing legal drafting that plagues many industries.

Another area where the URC is beneficial is in digital contracts and execution. Both vendors and consumers benefit from being able to apply the URC to digital contract formation, allowing them a granular view of usage permissions and prohibitions attached to contracts. Both sides of the markets can also benefit from the ability to add permitted and restricted uses to existing contracts.

Another area where the URC is beneficial is in integration with other systems. The URC can be integrated into multiple client and external systems, both proprietary and third party, for tracking and identifying usage permissions and prohibitions. In an example, many consumers of data leverage Inventory Management Systems to keep track of vendor costs, license assignments, as well as products, in which case the URC can allow for a more granular approach of usage rights purchased within products. In another example, many consumers leverage Permissioning Systems that give internal users access to products and services for which they are licensed, in which case the URC can allow for a centralized, single taxonomy to manage all usage permissions and prohibitions for the organization. In another example, across virtually every industry, the ability for the vendor and the consumer to have common codes applied to invoices can allow for the digitization of invoice reconciliation. In such an example, the URC can integrate into both Invoicing and Accounting Systems, allowing for a single, centralized, unique taxonomy that identifies the usage rights connected to products and services. The URC can thus minimize existing friction in many markets that require expensive invoice reconciliation services, and ultimately reduce receivables processing costs and receivables aging.

In another example, URCs can be used to identify which products, out of a catalog of available products, are able to be used for a desired use. By providing information about a desired use, the system can determine what usage rights are necessary. Then, the URCs associated with each of the products in the catalog of available products can be compared with the determined necessary usage rights to determine whether or not the URC satisfies the necessary usage rights. For those properties that do have URCs that satisfy the necessary usage rights, an indication can be made that those properties are able to be used for the desired use. In such an example, a user desiring to make use of an image for a television advertising campaign may input the desired use (television advertising campaign), which can then be used to determine the necessary usage rights to undertake the desired use. Then, as the user browses the available images, only those images that are associated with URCs that satisfy the necessary usage rights will be displayed. In other words, the only images that would be shown to the user are those for which appropriate contracts are in place to permit the desired use of the image in a television advertising campaign.

The use of URCs as disclosed herein can provide numerous improvements to the operation of a computing system and to the technical field of rights management. The use of URCs as disclosed herein can enable computing systems to interpret, search for, and otherwise leverage contract terms with much more speed and accuracy than traditional techniques (e.g., use of plain text of contracts). Further, the use of URCs as disclosed herein can provide rights management systems with advanced functionality, such as the ability to embed contract terms within metadata of a property without occupying significant space (e.g., occupying less space than full text of a contract) and without storing full text of a contract in the metadata, which may carry privacy risks or be otherwise undesired. Further, the use of URCs as disclosed herein can improve rights management systems by enabling automatic access control or compliance control for properties by quickly and easily comparing necessary rights with retained rights via a comparison of at least portions of URC strings. Further, the use of URCs as disclosed herein can improve rights management systems by enabling automatic obtaining or removal of rights via a comparison of at least portions of URC strings of retained rights with a set of necessary rights. Use of URCs as disclosed herein can provide additional benefits and improvements, as well.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may not be drawn to scale.

FIG. 1 is a schematic diagram depicting an environment 100 for uniform usage rights management, according to certain aspects of the present disclosure. The environment 100 can include a computing device 102 and any number of databases 104, 108, 112. The computing device 102 can be a single computer (e.g., a server, a desktop computer, or a smartphone) or can be implemented across a number of devices (e.g., a collection of servers networked together). The computing device 102 can perform computational functions as disclosed in further detail herein, such as those described with reference to processes 500, 600, and 700 of FIGS. 5, 6, and 7, respectively.

In some cases, multiple computing devices 102 can be used for different purposes. For example, a first computing device may be used to store and make accessible data in any of databases 104, 108, 112; a second computing device may be used to implement a network-accessible (e.g., Internet-accessible) tool for managing URCs (e.g., generating, decoding, or otherwise leveraging URCs); a third computing device may be used to administer the first and second computing devices; and a fourth computing device (e.g., a user device, such as a personal computer or smartphone) can be used to access the first and/or second computing devices. Other arrangements can be used.

The environment can include a property database 104, a contract database 108, and a URC database 114. The property database 104, contract database 108, and URC database 114 can be implemented as individual databases, a combination of individual and combined databases, or as a single, combined database. Additionally, the property database 104, contract database 108, and URC database 114 can be stored in any combination of storage devices (e.g., hard drives, solid state drives, networked attached storage devices, etc.). In some cases, additional or fewer databases can be used.

The property database 104 can include property information related to a set of properties 106. This property information can include information usable to identify, locate, and/or access the properties in the set of properties 106. In some cases, this property information can be the properties themselves (e.g., the underlying data of a data property).

The contract database 108 can include contract information related to a set of contracts 110. Each contract in the set of contracts 110 can be associated with one or more properties of the set of properties 106, with one or more grantors, and with one or more grantees. The contract information can include information usable to identify, locate, and/or access the contracts in the set of contracts 110. In some cases, the contract information can include underlying information about the contract, such as contract terms, associated property information, associated grantor information, associated grantee information, and the like.

The URC database 112 can include a set of URC tables 116 and one or more URCs 114. The set of URC tables 116 can include one or more tables (e.g., databases) of codes for building and interpreting URCs. For example, the set of URC tables 116 can include i) a usage rights category table containing a list of categories and their associated category codes; ii) an action attribute table containing a list of action attributes and their associated action attribute codes; and iii) one or more provision attribute tables containing one or more lists of provision attributes and their associated provision attribute codes, optionally including a table index containing a list of the one or more provision attribute tables and associated table codes. While described as separate tables, the set of URC tables 116 can be implemented as a single table or database or can be otherwise implemented to provide lookup access for the purpose of encoding or decoding a URC.

Each of the one or more URCs 114 stored in the URC database 112 can be an alphanumeric string, with optional symbols, that represents a set of contract terms associated with one or more particular properties (e.g., a property of the set of properties 106) and/or one or more particular contracts (e.g., a contract of the set of contracts 110). Generally, a URC would be associated with a particular contract/property combination, however that need not always be the case. In some cases, a URC can be associated with a particular property, encoding contract terms from multiple contracts associated with that particular property (e.g., a first contract granting rights to publish and a second contract granting rights to create derivative works). In some cases, a URC can be associated with a particular contract, encoding the contract terms from that particular contract. When associated with a particular contract/property combination, the URC can encode contract terms from a single contract that are applicable to a particular property.

When a URC is generated for a given contract and/or property, the URC can be stored as one of the one or more URCs 114 in the URC database 112 for subsequent access. When new usage rights are acquired or existing usage rights are removed (e.g., when a contract's terms are updated), the associated URC in the URC database 112 can be updated accordingly.

While depicted in disparate databases, in some cases the one or more URCs 114 can be stored as part of a property and/or a contract (e.g., stored as a text string within the contract text) and/or can be stored in metadata accompanying a property and/or a contract (e.g., stored as a text string in a metadata file associated with and/or bundled with a particular property).

Figure 2:
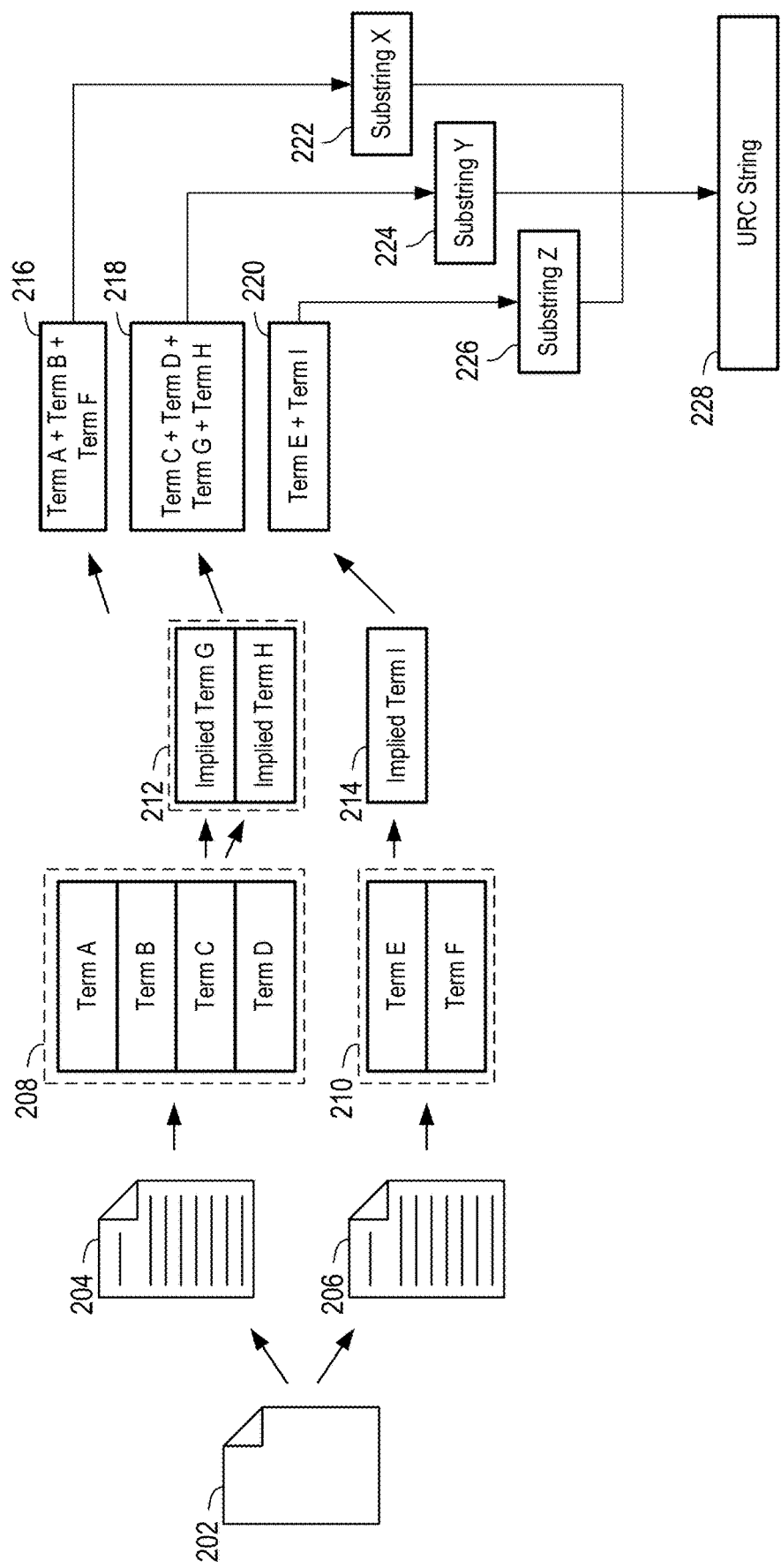
FIG. 2 is a schematic diagram depicting encoding of a usage rights code, according to certain aspects of the present disclosure.

FIG. 2 is a schematic diagram depicting encoding of a usage rights code, according to certain aspects of the present disclosure. A property 202 (e.g., a data product) can be owned by a grantor. The grantor can enter into two contracts 204, 206 to convey certain usage rights to a licensee. Contract 204 can include a first set of terms 208, which can include Term A, Term B, Term C, and Term D. Contract 206 can include a second set of terms 210, which can include Term E and Term F.

In some optional cases, the terms of the contracts (e.g., set of terms 208 and set of terms 210) can be used to generate one or more implied terms, such as a first set of implied terms 212 and a second set of implied terms 214. An implied term is a contract term that can be assumed given one or more other known contract terms. For example, if Term E states that for derivative works, the user may only build products that do not compete with vendor offerings, then the system can generate an Implied Term I that states for derivative works, the user may not/must not build a competitive offering. As depicted in the example of FIG. 2, Term C is used to generate Implied Term G and Implied Term H, and Term E is used to generate Implied Term I.

The various terms, including implied terms, when used, can be used to generate term bundles 216, 218, 220. Term bundles can be organized in any suitable fashion, although in general each term bundle can be associated with a particular category of usage right. For example, term bundle 216—which includes Term A and Term B from the first set of terms 208 from the first contract 204, as well as Term F from the second set of terms 210 from the second contract 206—can include terms that are all associated with the category of Publishing. Term bundle 218 may include terms that are all associated with the category of Storage, and term bundle 220 may include terms that are all associated with the category of Derivative Works.

The term bundles 216, 218, 220 can then be encoded into substring X 222, substring Y 224, and substring Z 226, respectively, based on the URC schema disclosed herein. Thus, substring X 222 would be a substring that is associated with the Publishing category, substring Y 224 would be a substring that is associated with the Storage category, and substring Z 226 would be a substring that is associated with the Derivative Works category. In some cases, multiple substrings can be made from a single category, although generally each category would be associated with a single substring that encodes all of the contract terms associated with that category.

After generation of the substrings 222, 224, 226, the substrings can be used to generate the URC string 228. The URC string 228 can be a concatenation of the various substrings 222, 224, 226, although in some cases other techniques for generating a URC string 228 from substrings 222, 224, 226 can be used.

The pathway depicted in FIG. 2 depicts two contracts 204, 206 used to define the rights in a single piece of property 202. When multiple contracts exist covering a single piece of property 202, the contract terms can be optionally be bundled together to generate a single URC string 228 that represents the bundle of rights afforded to the property 202 by the multiple contracts 204, 206. In some cases, however, a URC string 228 can be generated based on solely a single contract. If applied to the property 202, the use of per-contract URCs would lead to a first URC based on the first contract 204 and a second URC based on the second contract 206.

The pathway depicted in FIG. 2 is shown with various elements for illustrative purposes. Ultimately, any number of properties, any number of contracts, any number of terms and term bundles, any number of substrings, and any number of URC strings can be used, as appropriate.

FIG. 3 is a chart 300 depicting an example usage rights code and its associated terms, according to certain aspects of the present disclosure. As depicted in chart 300, the URC string (E.g., URC code) shown is:

AN{nnn:01-3004,3005(bbb:07-3012)}AA{bbb:01-1127, 1134/ddd:02-1190[aaa:05-1100,1103,1104/ccc:05-1134]/ddd:02-1140[fff:07-1173/bbb:07-1127)]/ggg:00-1199,ccc:00-1104[bbb:07-1127]}AG{iii:02-YL1002 [mmm:05-1157,1166#2]/jjj:00-2828,2268,2266[*jjj: 06-2268,2266/ccc:06-1112,1111*(aaa:05-1179)]/bbb: 00-1130[jjj-06]}

This URC string is composed of three substrings:
1) AN{nnn:01-3004,3005(bbb:07-3012)}
2) AA{bbb:01-1127,1134/ddd:02-1190[aaa:05-1100, 1103,1104/eec:05-1134]/ddd:02-1140[fff:07-1173/bbb: 07-1127)]/ggg:00-1199,ccc:00-1104[bbb:07-1127]}
3) AG{iii:02-YL1002[mmm:05-1157,1166#2]/jjj:00-2828,2268,2266[*jjj:06-2268,2266/ccc:06-1112,1111* (aaa:05-1179)]/bbb:00-1130[jjj-06]}

The first substring is associated with required actions and exceptions for the Reporting and Auditing usage rights category, thus defining certain actions that the licensee must undertake or provide as part of the contracted rights. The second substring is associated with permitted uses, prohibited uses, required actions, and exceptions for the Derivative Works usage rights categories. The third substring is associated with permitted uses, prohibited uses, required actions, and exceptions for the Publishing usage rights categories.

As seen in FIG. 3, given certain contract terms, implied terms can be generated. When desired, the implied terms can be included in the substrings and URC string. Inclusion of implied terms can facilitate comparing different URC strings and determining whether a given URC string includes the necessary rights desired by the licensee.

Figure 4:
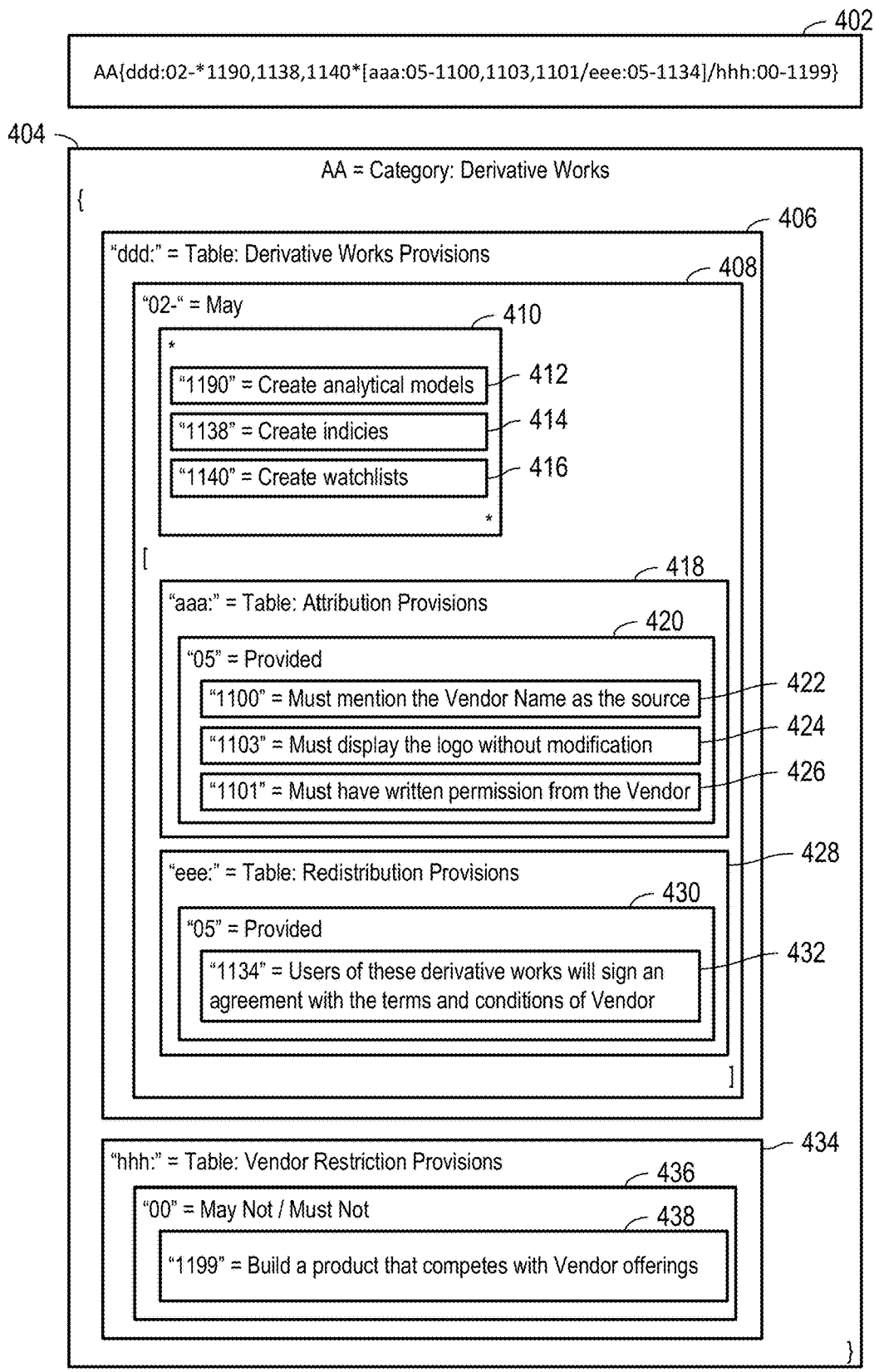
FIG. 4 is a schematic diagram depicting the structure of a usage rights code, according to certain aspects of the present disclosure.

FIG. 4 is a schematic diagram depicting the structure of a usage rights code 402, according to certain aspects of the present disclosure. The URC 402 depicted in FIG. 4 is composed of a single substring, although often a URC would be composed of multiple substrings. While a URC 402 and/or a substring can take on any suitable structure, it has been determined that the structure depicted in FIG. 4 can provide benefits to ensure any desired logical combination of contract terms can be clearly and accurately represented. This type of structure can be especially useful when granular control of contract terms is desired. This type of structure can be especially useful when contract terms define required actions and exceptions in addition to permitted uses and/or prohibited uses.

The URC 402 shown is AA{ddd:02-*1190,1138,1140* [aaa:05-1100,1103,1101/ccc:05-1134]/hhh:00-1199}.

The "AA" portion of the URC 402 represents the category code 404 to which a set of contract terms relates. Here, "AA" represents the category of Derivative Works. Braces (e.g., "{" and "}") can define a grouping of codes that fall within the category code 404. Within the category code 404 is presented table code "ddd" 406 and table code "hhh" 434 at the same level of hierarchy, as denoted by the forward slash (e.g. "/") separating the two. Table code "aaa" 418 and table code "eee" 428 are enclosed within a lower level of hierarchy, as denoted by the brackets (e.g., "[" and "]").

Table code "ddd" 406 indicates the provision attribute codes within the table code "ddd" 406 grouping are those related to Derivative Works Provisions. Table code "hhh" 434 indicates the provision attribute codes within the table code "hhh" 434 grouping are those related to Vendor Restriction Provisions. Table code "aaa" 418 indicates the provision attribute codes within the table code "aaa" 418 grouping are those related to Attribute Provisions. Table code "eee" 428 indicates the provision attribute codes within the table code "eee" 428 grouping are those related to Redistribution Provisions.

Within each table code grouping, action attribute codes and provision attribute codes can be expressed to define the given terms. Within table code "ddd" 406, an action attribute code "02" 408 is presented. This action attribute code "02" 408 represents the "may" action. Within the action attribute code "02" 408 are presented provision attribute code "1190" 412, provision attribute code "1138" 414, and provision attribute code "1140" 416, representing "create analytical models," "create indices," and "create watchlists," respectively. As these codes are separated by a comma (e.g., ","), they are intended to all apply to the preceding action attribute code.

Also within table code "ddd" 406, table code "aaa" 418 and table code "eee" 428 are presented, each containing a respective action attribute code "05" 420, 430, which relate to the "provided" action attribute. Thus, the contents of table code "aaa" 418 and table code "eee" 428 are to be interpreted as additional requirements on the prior content of table code "ddd" 406. Generally additional requirements such as these are to be interpreted as applying to the immediately preceding element (e.g., provision attribute code "1140" 416). However, the use of asterisks 410 (e.g., "*") surrounding a set of elements ensures the additional requirements are interpreted as applying to each of the elements within the asterisks. Thus, since provision attribute code "1190" 412, provision attribute code "1138" 414, and provision attribute code "1140" 416 are all located within a set of asterisks 410, the additional requirements of table code "aaa" 418 and table code "eee" 428 apply to each of the terms denoted by those provision attribute codes.

Here, the permissions granted via provision attribute code "1190" 412, provision attribute code "1138" 414, and provision attribute code "1140" 416 are conditioned via provision attribute code "1100" 422, provision attribute code "1103" 424, provision attribute code "1101" 426, and provision attribute code "1134" 432. It will be understood that while these various provision attribute codes are denoted by four digit numbers, the table code within which the provision attribute codes are located further denote with which table the four digit numbers are to be used. For example, a provision attribute code of "2345" within table code "ddd" 406 may describe an entirely different provision attribute than that same provision attribute code within table "eee" 428. In other words, a provision attribute code can be alternatively presented with a prefix of the appropriate table code. For example, provision attribute code "1190" 412 may be described as provision attribute code "ddd1190" and provision attribute code "1134" 432 may be described as provision attribute code "eee1134."

After the conclusion of the table code "ddd" 408, table code "hhh" 434 can include action attribute code "00" 436, which can include provision attribute code "1199" 438.

As depicted in FIG. 4, the URC 402 can describe a situation where a user is permitted to create analytical models, indices, and watchlists, provided they mention the vendor name as the source, display the logo without modification, have written permission from the vendor, and have users of the derivative works sign an agreement with the terms and conditions of the vendor; and the user is not permitted to build a product that competes with Vendor offerings.

As seen in FIG. 4, the URC 402 can initially describe permitted uses (e.g., the contents of table code "ddd" 406 and more specifically the provision attributes 412, 414, 416 within the action attribute "02" 408. After the permitted uses, the URC 402 can describe prohibited uses (e.g., the contents of table code "hhh" 434, which is located after table code "ddd" 406). After the prohibited uses, the URC 402 can describe required actions and exceptions, such as seen with respect to table code "aaa" 418 and table code "eee" 428, both of which are located within the action attribute "02" 408 grouping.

By using a known format, any URCs generated for a given set of contract terms will remain consistent and uniform.

Figure 5:
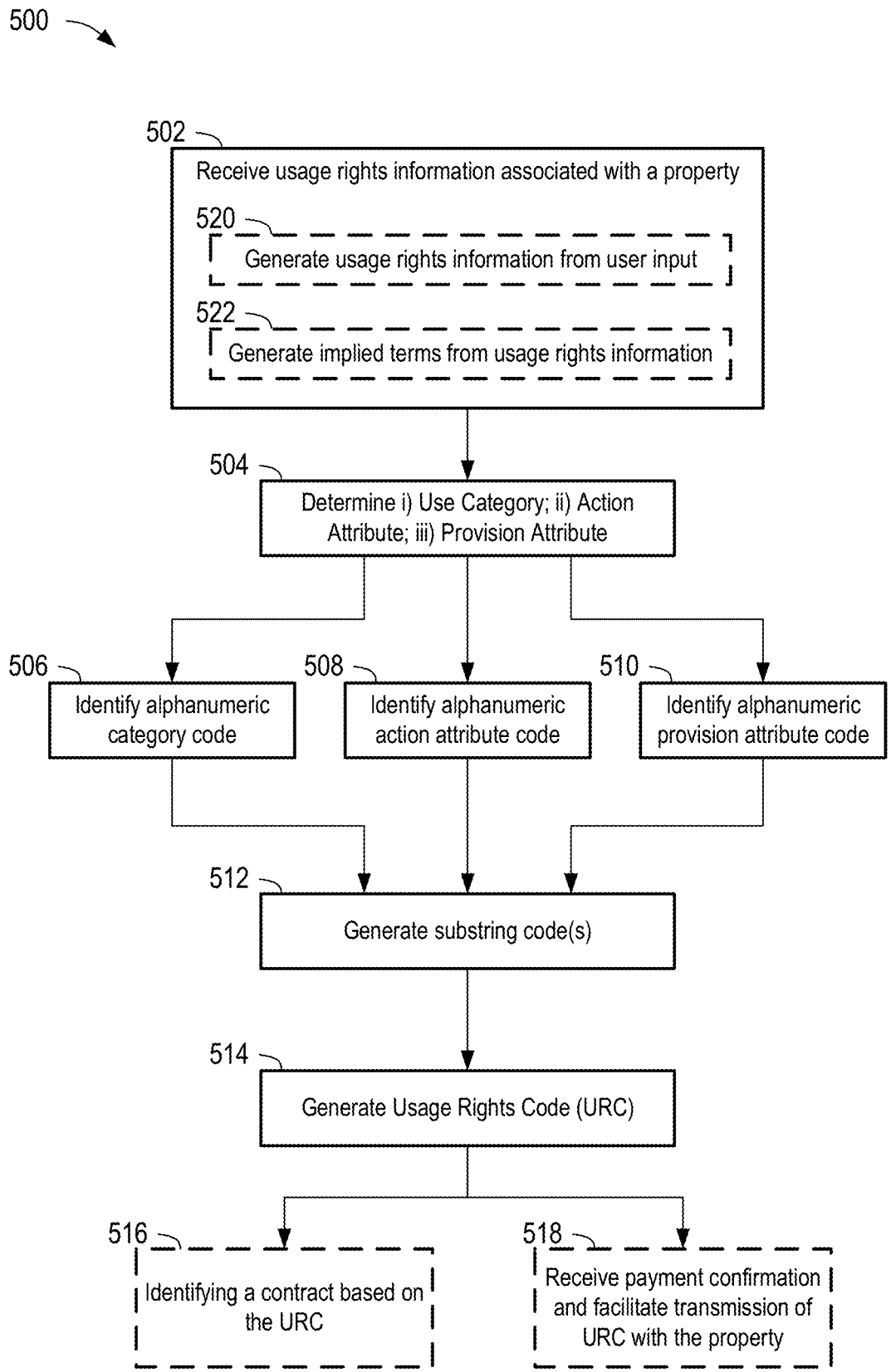
FIG. 5 is a flowchart depicting a process for generating a usage rights code, according to certain aspects of the present disclosure.

FIG. 5 is a flowchart depicting a process 500 for generating a usage rights code, according to certain aspects of the present disclosure. Process 500 can be performed by one or more computing devices, such as computing device 102 of FIG. 1.

At block 502, usage rights information associated with a property is received. Receiving usage rights information can include receiving information about one or more usage rights, such as one or more usage rights granted by one or more contracts. The usage rights information can include one or more usage rights terms (e.g., contract terms). Each usage right term can be indicative of a permission and/or restriction associated with the property (e.g., a permitted use, prohibited use, required action, and/or exclusion).

In some cases, usage rights information can be received directly, such as by accessing a database of usage rights. In some cases, receiving usage rights information at block 502 can include generating the usage rights information from user input at block 520. In some cases, generating the usage rights information from user input at block 520 can include receiving usage rights terms via user input. For example, a user may be prompted to input the desired usage rights terms for a data product they wish to license. This input can occur in free text, via dropdown menus or other constrained response options, or otherwise. Once the user input is received, the various usage rights terms described by the user input can be used as or as part of the usage rights information. In some cases, generating the usage rights information from user input at block 520 can include receiving contract text and parsing the contract text to extract one or more usage terms, which can be used as or as part of the usage rights information. In some cases, parsing the contract to extract the usage term(s) can include extracting a proposed set of usage rights terms, presenting the proposed set of usage rights terms to a user, and receiving user input to accept, deny, or amend at least one usage rights term of the proposed set of usage rights terms. This updated set of usage rights terms can then be used as or as part of the usage rights information.

In some optional cases, receiving usage rights information at block 502 can include generating implied terms from usage rights information at block 522. Generating implied terms at block 522 can include using known usage rights term(s) (e.g., as otherwise received at block 502) to identify one or more implied terms that must be true when the known usage rights term(s) are true. For example, a set of known usage rights terms denoting that "derivative works can be created provided they do not compete with the vendor" can be used to identify the implied term that "derivative works that compete with the vendor cannot be created."

At block 504, the usage rights information (e.g., usage rights term(s)) from block 502 can be used to determine i) one or more usage rights categories; ii) one or more action attributes; and iii) one or more provision attributes. As described in further detail herein, combinations of at least one usage rights category, at least one action attribute, and at least one provision attribute can be used to define the various usage rights terms from block 502. URC tables, such as those disclosed in further detail herein, can be used to identify appropriate usage rights categories, action attributes, and/or provision attributes.

At block 506, an alphanumeric category code can be identified for each of the one or more usage rights categories determined at block 504. At block 508, an alphanumeric action attribute code can be identified for each of the one or more action attributes determined at block 504. At block 510, an alphanumeric provision attribute code can be identified for each of the one or more provision attributes determined at block 504. URC tables, such as those disclosed in further detail herein, can be used to identify appropriate usage rights category codes, action attribute codes, and/or provision attribute codes.

At block 512, one or more substring codes can be generated based at least in part on the alphanumeric category code(s) from block 506, the action attribute code(s) from block 508, and the provision attribute code(s) from block 510. In some cases, a substring code can be generated for each of the alphanumeric category codes identified at block 506. Generating a substring code at block 512 can include leveraging the usage rights terms from block 502 to ensure the substring describes the usage rights terms.

At block 514, a usage rights code (URC) can be generated. Generating the URC can be based on the substring(s) generated at block 512. In some cases, generating the URC can include concatenating the substrings from block 512. In some cases, at least two substring codes are generated at block 512 and generating the URC at block 514 can include concatenating the two substring codes from block 512.

The resultant URC from block 514 can then be leveraged for various purposes.

At optional block 516, a contract can be identified based at least in part on the URC generated at block 514. For example, if a user wished to find a particular contract that they had previously entered into, they may input into a search system the desired contract terms. The search system may then generate a URC based on the user's input and use that URC to search for matching (e.g., exactly matching or partially matching) contracts in a contract database. One or more matching contracts can then be provided to the user, optionally with an indication as to the closeness of the match. In some cases, identifying a contract at block 516 can include identifying a contract that includes at least the contract terms included in the generated URC from block 514 and that does not include any contrary contract terms (e.g., contract terms that render any of the contract terms from the generated URC unperformable or moot). For example, a user desiring to publish a data product on a podcast may put that contract term into the search system, which may generate an appropriate URC based on the user input, and which may use the generated UPC to identify a set of contracts. Out of the set of contracts, a first contract may match exactly, a second contract may match but also include additional permissions (e.g., permission to distribute in print), and a third contract may match but also include a contrary contract term (e.g., permission to distribute over the Internet and over recorded media, provided distribution does not occur in audio format). Out of this set of contracts, the first and second contracts may be indicated as matching contracts, with the first contract being indicated as having a closer match than the second contract (e.g., a higher matching score).

In some cases, identifying a contract at block 516 can include identifying an existing contract already in use (e.g., already executed and still valid). In some cases, however, identifying a contract at block 516 can include identifying a prospective contract that can be acquired (e.g., a obtainable usage rights product), such as out of a database of prospective contracts available for purchase. In such cases, the URC can be used to identify a particular prospective contract, which can then be purchased by a grantee to cause the prospective contract to become an in-use contract.

At optional block 518, a payment confirmation can be received indicative of a payment transaction associated with procurement of the one or more usage rights from block 502. Thus, receiving the payment confirmation can be confirmation that the grantee has sufficient rights, such as sufficient rights to access the property. Block 518 can continue with facilitating transmission of the property to a receiving entity (e.g., grantee) in response to receiving the payment confirmation. In some cases, facilitating transmission of the property can include facilitating transmission of the URC in association with the property, such as in an accompanying file or embedded in the property. For example, a user desiring to purchase a data product for publication in a newspaper may provide user input containing desired usage rights (e.g., right to distribute in print, right to distribute in a particular geographic region, etc.), which can then be used to generate a URC (e.g., at block 514) associated with the desired usage rights. A system can then facilitate purchasing the desired usage rights and provide access to the data product (e.g., facilitate transmission of the property). As part of providing access to the data product, the system can supply the URC (e.g., the URC representative of the desired usage rights that have been purchased) in association with the property, such as embedded in the property (e.g., as embedded metadata), supplied as a separate file along with the property (e.g., as a separate metadata file or a separate usage rights file), or otherwise transmitted in association with the property (e.g., supplied in the body of an email containing a link to or instructs to access the property).

A generated URC at block 514 can be used for other purposes as well. For example, the generated URC can be stored in association with a contract or property (e.g., embedded in a contract file or property file), stored in a separate file associated with the contract or property (e.g., as a separate metadata file or a separate usage rights file), or the like. In some cases, the URC can be output via an output device, such as presented on a display (e.g., in a graphical user interface). In some cases, presenting the URC can occur dynamically as a user provides user input at block 502. For example, as a user selects various desired usage rights, a URC can be dynamically presented and updated as the user provides their input.

While described with various blocks in a particular order, process 500 can be performed with additional or fewer blocks, as well as with blocks in different orders, as appropriate. For example, in some cases, block 502 may occur without blocks 520, 522.

Figure 6:
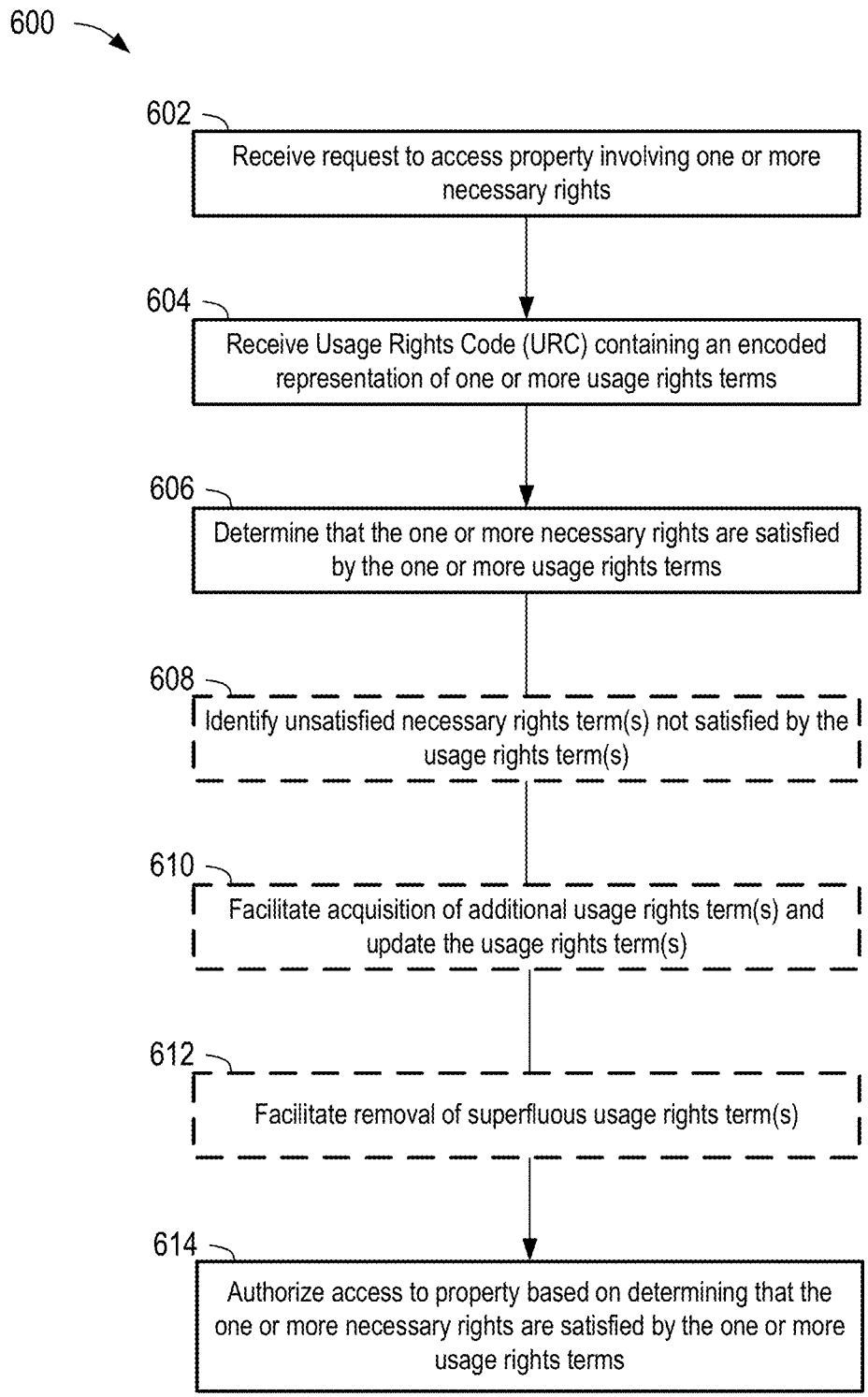
FIG. 6 is a flowchart depicting a process for controlling access to a property based on a usage rights code, according to certain aspects of the present disclosure.

FIG. 6 is a flowchart depicting a process 600 for controlling access to a property based on a usage rights code, according to certain aspects of the present disclosure. Process 600 can be performed by one or more computing devices, such as computing device 102 of FIG. 1.

At block 602, a request to access a property can be received. The request to access the property can be a digital request that contains request information about how the requested property is to be used. For example, a request to access a data product may include information such as how the data product will be stored, how the user will create derivative works out of the data product, and where the derivative works will be distributed. The request information can thus be indicative of a set of one or more necessary rights (e.g., usage rights that are necessary to perform the desired use associated with the request to access the property.

The request to access the property can be initiated by a licensee. In some cases, the request to access can include preset request information for a predetermined use. In some cases, the request to access can include dynamic request information that is generated in response to the licensee initiating the request for access. As an example, dynamic request information can be the current time of the request for access, a current geolocation or other location (e.g., an exact location, such as longitude and latitude; a regional location, such as North America; a political location, such as a country, state, or city; or a network location, such as a particular Internet Protocol address) of the licensee, and the like. This dynamic request information can be used to establish a necessary usage right. For example, given a current time of the request for access, the necessary usage right can start at the current time and extend until a stop time a set period of time after the current time.

At block 604, a URC can be received. The URC can contain an encoded representation of one or more usage rights terms. The URC can be associated with one or more contracts in-use by the licensee. Thus, the URC can be representative of the usage rights already granted to the party requesting access. The URC received at block 604 can be associated with the property requested from block 602 such that the usage rights indicated by the URC are usage rights associated with the requested property.

At block 606, a determination can be made as to whether or not the one or more necessary rights from block 602 are satisfied by the one or more usage rights terms from block 604. Determining whether or not a necessary right is satisfied by the one or more usage rights can be based at least in part on the codes (e.g., category code, action attribute code, and provision attribute code) contained within the URC. For example, a temporary URC can be generated for the set of one or more necessary rights (e.g., in a process similar to process 500 of FIG. 5), and this temporary URC can be compared to the URC from block 604 to determine whether or not there are sufficient matching portions such that the URC from block 604 is deemed to satisfy the temporary URC. The URC is deemed to satisfy the temporary URC when the URC contains code(s) that provide for the one or more necessary rights. For example, if a necessary right is the right to generate derivative works without attribution, the URC from block 604 would be deemed to satisfy the necessary right(s) as long as it permits generation of derivative works without attribution and contains no contrary terms that would render generation of derivative works without attribution impossible or moot. In some cases, a URC can be decoded prior to determining whether or not the one or more necessary rights are satisfied.

At optional block 608, one or more unsatisfied necessary rights terms can be identified. An unsatisfied necessary rights term can be any of the one or more necessary rights from block 602 that are not satisfied by the URC from block 604. In some cases, the one or more unsatisfied necessary rights terms can be presented to a user, such as to allow the user an opportunity to adjust the request to access the property to avoid the unsatisfied necessary rights term(s). For example, if the original request to access the property request rights to distribute in the US and Canada, but the URC only affords distribution rights in the US, the user may be warned that their current usage rights do not permit distribution in Canada. In some cases, the user may then be presented with an opportunity to adjust the original request to access the property to remove Canada.

In some cases, such as at optional block 610, acquisition of one or more additional rights terms can be facilitated to update the determined usage rights terms with any rights terms that are needed to satisfy the necessary rights from block 602. In the above example, instead of generating a warning to the user that the current usage rights do not permit distribution in Canada, the system can automatically (e.g., automatically based on a default consent) or semi-automatically (e.g., in response to the user confirming consent) acquire (e.g., purchase) the rights to permit distribution in Canada. The URC from block 604 can then be updated with the newly acquired rights and process 600 can continue with a further iteration of block 606, which should result in a determination that the one or more necessary rights are satisfied.

At optional block 612, removal of one or more superfluous usage rights terms can be facilitated. In such cases, a determination can be made at block 612 that the URC from block 604 contains one or more superfluous usage rights terms that are not required to satisfy the one or more necessary rights at block 606. In some cases, the licensee may have no other need for these superfluous usage rights terms. In some cases, the user can be notified of the superfluous usage rights terms, in which case the user may desire to look into the contract further to determine if any usage rights terms can be removed to reduce costs. In some cases, the one or more superfluous usage rights terms can be automatically (e.g., automatically based on a default consent) or semi-automatically (e.g., in response to the user confirming consent) removed. In such cases, the URC from block 604, and the underlying contract(s), can be updated to remove the superfluous usage right(s).

At block 614, access to the property can be authorized based at least in part on the determination from block 606. Access to the property can be automatically authorized in response to determining that the one or more necessary rights are satisfied by the one or more usage rights terms at block 606. Likewise, if it is determined that one or more of the one or more necessary rights are not satisfied by the URC from block 604, access to the property can be denied.

While described with various blocks in a particular order, process 600 can be performed with additional or fewer blocks, as well as with blocks in different orders, as appropriate. For example, in some cases, process 600 may occur without blocks 608, 610, 612. In another example, process 600 can include a new block that involves transmitting a notification (e.g., to a supplier associated with the one or more usage rights terms associated with the URC from block 604) in response to authorizing access at block 614.

Figure 7:
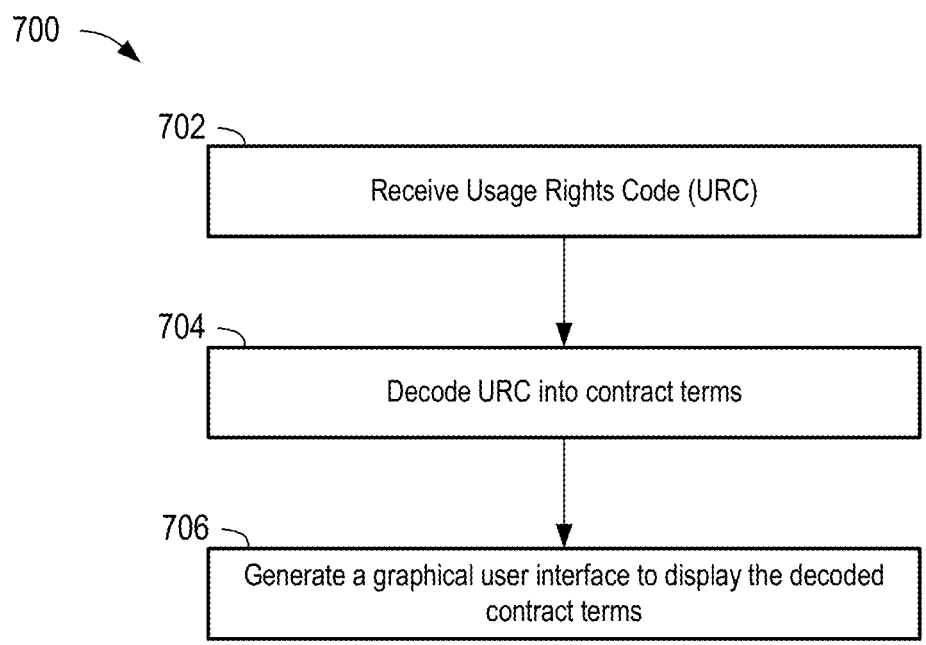
FIG. 7 is a flowchart depicting a process for displaying contract terms from a usage rights code, according to certain aspects of the present disclosure.

FIG. 7 is a flowchart depicting a process 700 for displaying contract terms from a usage rights code, according to certain aspects of the present disclosure. Process 700 can be performed by one or more computing devices, such as computing device 102 of FIG. 1.

At block 702, a URC can be received. The URC can be received in any suitable fashion, such as by extracting the URC from a message containing the URC, by extracting the URC from a property or a file associated with a property (e.g., a metadata file), by extracting the URC from a contract that includes the URC, or by generating the URC from one or more contract terms (e.g., as acquired by parsing a contract). In an example, a user may access a database containing information about the properties available to the user. The user may access one or more URCs associated with the properties and/or associated with contracts for use of the properties.

At block 704, the URC can be decoded into contract terms. Decoding the URC into contract terms can include converting the URC string into a uniform listing of the contract terms. In some cases, decoding the URC into contract terms can include identifying whether or not a set of predetermined usage rights is satisfied by the contract terms decoded from the URC. For example, instead of decoding every contract term in the URC, decoding the contract terms at block 704 can include decoding only those contract terms that are relevant to a set of predetermined usage rights, such as whether or not the user can redistribute the property in the US, the EU, or China. In such cases, decoding the URC can include generating an indication as to whether or not the various usage rights in the set of predetermined usage rights is satisfied. In the above example, a given URC may be decoded to indicate "1) Redistribution in the US: Yes, with attribution; 2) Redistribution in the EU: No; 3) Redistribution in China: Yes." In some cases, however, decoding the URC can include decoding all of the contract terms encoded by the URC.

At block 706, a graphical user interface (GUI) can be generated to display the decoded contract terms from block 704. Combining the above examples, a GUI may display a database of properties available to the user. In such an example, URCs for each of the properties may be displayed or processed on the backend. For each of the properties, decoded contract terms can be presented to the user in the GUI. For example, the GUI may present the database as a spreadsheet, with new rows for each property, and with columns for certain common or otherwise desired rights. In the above example, there may be a column for redistribution in the US, a column for redistribution in the EU, and a column for redistribution in China.

In an alternate example, a GUI can display a received URC in a first display element and the decoded contract terms in an adjacent display element. Other arrangements can be used.

While described with various blocks in a particular order, process 700 can be performed with additional or fewer blocks, as well as with blocks in different orders, as appropriate.

Figure 8:
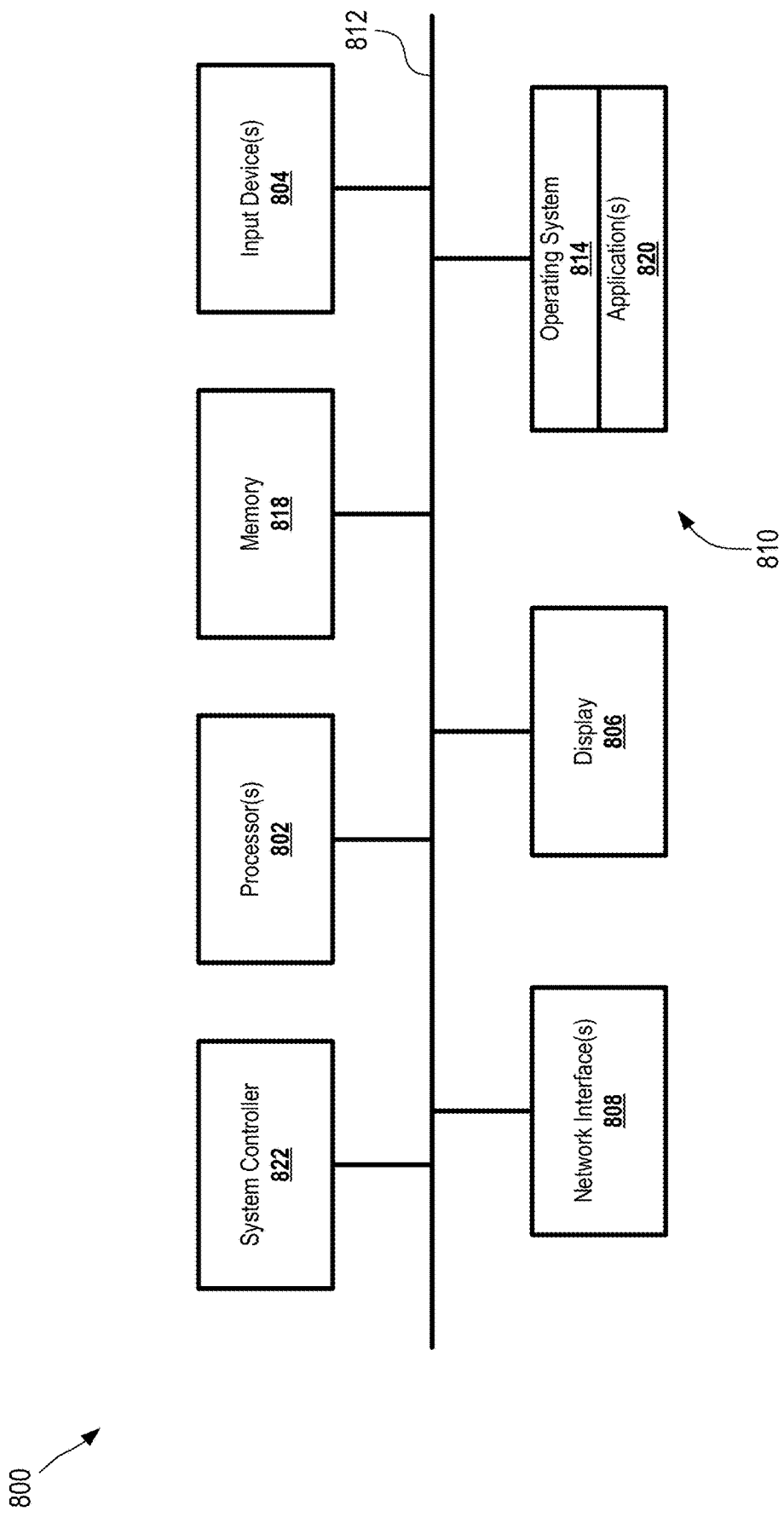
FIG. 8 is a block diagram of an example system architecture for implementing features and processes of the present disclosure.

FIG. 8 is a block diagram of an example system architecture 800 for implementing features and processes of the present disclosure, such as those presented with reference to processes 500, 600, and 700 of FIGS. 5, 6, and 7, respectively. The features and processes disclosed herein can be implemented using one or multiple instances of system architecture 800 (e.g., in a single instance example, a single computer can generate a UPID from a data package stored on the single computer; in a multiple instances example, a first computer may generate a UPID for a data package and transfer the UPID to a second computer, which decodes the UPID to identify attributes associated with the data package or generate an invoice associated with the UPID). The architecture 800 can be used to implement a server (e.g., a cloud-accessible server), a user device (e.g., a smartphone or personal computer), or any other suitable device for performing some or all of the aspects of the present disclosure. The architecture 800 can be implemented on any electronic device that runs software applications derived from compiled instructions, including without limitation personal computers, servers, smart phones, electronic tablets, game consoles, email devices, and the like. In some implementations, the architecture 800 can include one or more processors 802, one or more input devices 804, one or more display devices 806, one or more network interfaces 808, and one or more computer-readable mediums 810. Each of these components can be coupled by bus 812.

Display device 806 can be any known display technology, including but not limited to display devices using Liquid Crystal Display (LCD) or Light Emitting Diode (LED) technology. Processor(s) 802 can use any known processor technology, including but not limited to graphics processors and multi-core processors. Input device 804 can be any known input device technology, including but not limited to a keyboard (including a virtual keyboard), mouse, track ball, and touch-sensitive pad or display. In some cases, audio inputs can be used to provide audio signals, such as audio signals of an individual speaking. Bus 812 can be any known internal or external bus technology, including but not limited to ISA, EISA, PCI, PCI Express, NuBus, USB, Serial ATA or FireWire.

Computer-readable medium 810 can be any medium that participates in providing instructions to processor(s) 802 for execution, including without limitation, non-volatile storage media (e.g., optical disks, magnetic disks, flash drives, etc.) or volatile media (e.g., SDRAM, ROM, etc.). The computer-readable medium (e.g., storage devices, mediums, and memories) can include, for example, a cable or wireless signal containing a bit stream and the like. However, when mentioned, non-transitory computer-readable storage media expressly exclude media such as energy, carrier signals, electromagnetic waves, and signals per se.

Computer-readable medium 810 can include various instructions for implementing operating system 814 and applications 820 such as computer programs. The operating system can be multi-user, multiprocessing, multitasking, multithreading, real-time and the like. The operating system 814 performs basic tasks, including but not limited to: recognizing input from input device 804; sending output to display device 806; keeping track of files and directories on computer-readable medium 810; controlling peripheral devices (e.g., storage drives, interface devices, etc.) which can be controlled directly or through an I/O controller; and managing traffic on bus 812. Computer-readable medium 810 can include various instructions for implementing firmware processes, such as a BIOS. Computer-readable medium 810 can include various instructions for implementing any of the processes described herein, including at least processes 500, 600, and 700 of FIGS. 5, 6, and 7, respectively.

Memory 818 can include high-speed random-access memory and/or non-volatile memory, such as one or more magnetic disk storage devices, one or more optical storage devices, and/or flash memory (e.g., NAND, NOR). The memory 818 (e.g., computer-readable storage devices, mediums, and memories) can include a cable or wireless signal containing a bit stream and the like. However, when mentioned, non-transitory computer-readable storage media expressly exclude media such as energy, carrier signals, electromagnetic waves, and signals per se. The memory 818 can store an operating system, such as Darwin, RTXC, LINUX, UNIX, OS X, WINDOWS, or an embedded operating system such as VxWorks.

System controller 822 can be a service processor that operates independently of processor 802. In some implementations, system controller 822 can be a baseboard management controller (BMC). For example, a BMC is a specialized service processor that monitors the physical state of a computer, network server, or other hardware device using sensors and communicating with the system administrator through an independent connection. The BMC is configured on the motherboard or main circuit board of the device to be monitored. The sensors of a BMC can measure internal physical variables such as temperature, humidity, power-supply voltage, fan speeds, communications parameters and operating system (OS) functions.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random-access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computing system that includes a back-end component, such as a data server, or that includes a middleware component, such as an application server or an Internet server, or that includes a front-end component, such as a client computer having a graphical user interface or an Internet browser, or any combination thereof. The components of the system can be connected by any form or medium of digital data communication such as a communication network. Examples of communication networks include, e.g., a LAN, a WAN, and the computers and networks forming the Internet.

The computing system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an application programming interface (API). An API can define one or more parameters that are passed between a calling application and other software code (e.g., an operating system, library routine, function) that provides a service, which provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, and the like.

The foregoing description of the implementations, including illustrated implementations, has been presented only for the purpose of illustration and description and is not intended to be exhaustive or limiting to the precise forms disclosed. Numerous modifications, adaptations, and uses thereof will be apparent to those skilled in the art. Numerous changes to the disclosed implementations can be made in accordance with the disclosure herein, without departing from the spirit or scope of the present disclosure. Thus, the breadth and scope of the present disclosure should not be limited by any of the above-described implementations.

Although certain aspects and features of the present disclosure have been illustrated and described with respect to one or more implementations, equivalent alterations and modifications will occur or be known to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application.

One or more elements or aspects or steps, or any portion(s) thereof, from one or more of any of the below implementations and/or claims can be combined with one or more elements or aspects or steps, or any portion(s) thereof, from one or more of any of the other below implementations and/or claims or combinations thereof, to form one or more additional implementations and/or claims of the present disclosure.

Implementation 1 is a method comprising: receiving usage rights information associated with a property, wherein the usage rights information includes one or more usage rights terms, wherein each of the one or more usage rights terms is indicative of a permission or restriction associated with the property; determining, for each of the one or more usage rights terms, i) a use category, ii) an action attribute associated with the use category, and iii) a provision attribute associated with the use category and the action attribute, wherein the use category, the action attribute, and the provision attribute together represent at least a portion of the respective permission or restriction associated with the respective usage right term; identifying, for each of the determined usage rights categories, an alphanumeric category code; identifying, for each of the determined action attributes, an alphanumeric action attribute code; identifying, for each of the determined provision attributes, an alphanumeric provision attribute code; generating one or more substring codes based at least in part on the one or more alphanumeric category codes, the one or more alphanumeric action attribute codes, and the one or more alphanumeric provision attribute codes; and generating a usage rights code (URC) for the property based at least in part on each of the one or more substring codes, the URC being representative of the one or more usage rights terms.

Implementation 2 is the method of Implementation 1, wherein generating the one or more substring codes includes, for each of the determined usage rights categories, one or more alphanumeric category codes, generating a category substring based at least in part on i) the alphanumeric category code associated with the given usage rights category; ii) one or more of the determined action attributes associated with the given usage rights category; and iii) one or more of the determined provision attributes associated with the given action attribute and given usage rights category.

Implementation 3 is the method of Implementation 1 or Implementation 2, wherein receiving the usage rights information includes: presenting a selection interface including a plurality of usage right term options; receiving user input associated with selected ones of the plurality of usage right term options; and generating the usage rights information from the selected ones of the plurality of usage right term options.

Implementation 4 is the method of any one of Implementations 1 to 3, further comprising: accessing a database of usage rights contracts associated with the property, wherein each of the usage rights contracts in the database is associated with one or more contract URCs; identifying one or more usage rights contracts from the database of usage rights contracts based at least in part on matching the generated URC with the one or more contract URCs; and outputting an indication of the identified one or more usage rights contract.

Implementation 5 is the method of any one of Implementations 1 to 4, wherein receiving the usage rights specification information includes: receiving a contract file; parsing the contract file to identify a plurality of contract terms; and determining the usage rights information based at least in part on the identified plurality of contract terms.

Implementation 6 is the method of any one of Implementations 1 to 5, further comprising outputting the generated URC.

Implementation 7 is the method of any one of Implementations 1 to 6, wherein the property is a digital asset, the method further comprising embedding the URC in metadata associated with the digital asset.

Implementation 8 is the method of any one of Implementations 1 to 7, wherein the property is a digital asset, the method further comprising: receiving a payment confirmation, the payment confirmation indicative of a payment transaction associated with procurement of the one or more usage rights terms by a receiving entity; and facilitating transmission of the property to the receiving entity in response to receiving the payment confirmation, wherein facilitating transmission of the property includes facilitating transmission of the URC in association with the property.

Implementation 9 is the method of any one of Implementations 1 to 8, wherein receiving the usage rights information includes receiving geographic information associated with an intended use of the property, and wherein the one or more usage rights terms includes a geographic usage rights term based at least in part on the received geographic information.

Implementation 10 is the method of any one of Implementations 1 to 9, further comprising: accessing one or more databases of obtainable usage right products associated with the property, each usage right product including a respective URC indicating one or more obtainable usage right terms associated with the property; and identifying a set of one or more of the obtainable usage right products based at least in part on a comparison of the generated URC with the respective URCs of the obtainable usage rights products, wherein the identified set of one or more of the obtainable usage right products, when obtained, provides the one or more usage rights terms.

Implementation 11 is a system comprising: a control system including one or more processors; and a memory having stored thereon machine-readable instructions, wherein the control system is coupled to the memory, and the method of any one of Implementations 1 to 10 is implemented when the machine executable instructions in the memory are executed by at least one of the one or more processors of the control system.

Implementation 12 is a system for managing usage rights, the system including a control system configured to implement the method of any one of Implementations 1 to 10.

Implementation 13 is a computer program product comprising instructions which, when executed by a computer, cause the computer to carry out the method of any one of Implementations 1 to 10.

Implementation 14 is the computer program product of Implementation 13, wherein the computer program product is a non-transitory computer readable medium.

Implementation 15 is a method comprising: receiving, by a computing device, a request to access a property, the request to access the property involving one or more necessary rights; receiving a usage rights code (URC) associated with the request to access the property, the URC being an alphanumeric code indicative of one or more usage right terms, the one or more usage rights terms represented by a combination of one or more alphanumeric category codes, one or more alphanumeric action attribute codes, and one or more alphanumeric provision attribute codes; determining that the one or more necessary rights are satisfied by the one or more usage rights terms based at least in part on the combination of the one or more alphanumeric category codes, the one or more alphanumeric action attribute codes, and the one or more alphanumeric provision attribute codes; and authorizing access to the property in response to determining that the one or more necessary rights are satisfied.

Implementation 16 is the method of Implementation 15, wherein determining that the one or more necessary rights are satisfied by the one or more usage rights terms includes extracting one or more substring codes from the URC, wherein each of the one or more substring codes includes one of the one or more alphanumeric category codes and at least one action/provision combination associated with the given one of the one or more alphanumeric category codes, and wherein each of the at least one action/provision combinations includes i) at least one of the one or more alphanumeric action attribute codes associated with the given one of the one or more alphanumeric category codes; and ii) at least one of the one or more alphanumeric provision attribute codes associated with the given at least one of the one or more alphanumeric action attribute codes.

Implementation 17 is the method of Implementation 15 or Implementation 16, further comprising: identifying a supplier associated with the one or more usage right terms associated with the URC; and transmitting a notification to the supplier in response to authorizing access to the property.

Implementation 18 is the method of any one of Implementations 15 to 17, further comprising accessing metadata associated with the property, wherein receiving the URC includes extracting the URC from the metadata associated with the property.

Implementation 18 is the method of any one of Implementations 15 to 18, wherein the request to access the property includes a request to present the property via a presentation device, wherein the one or more necessary rights includes a necessary right associated with presenting the property via the presentation device.

Implementation 19 is the method of any one of Implementations 15 to 18, further comprising: initially determining that the one or more necessary rights are not satisfied by the determined one or more usage rights terms; identifying at least one unsatisfied necessary right from the one or more necessary rights; facilitating a transaction to acquire the one or more additional usage right terms; and updating the determined one or more usage rights terms with the one or more additional usage rights terms, such that the determined one or more usage rights terms now satisfy all of the one or more necessary rights.

Implementation 20 is the method of any one of Implementations 15 to 19, further comprising determining that the one or more usage right terms includes one or more superfluous usage right terms unnecessary to satisfy the one or more necessary rights; facilitating a transaction to remove the one or more superfluous usage right terms; and updating the URC to remove the one or more superfluous usage rights terms.

Implementation 21 is the method of any one of Implementations 15 to 20, wherein receiving the URC associated with the request to access the property includes: identifying a set of usage right terms associated with the request to access the property; generating the URC based at least in part on the identified set of usage right terms; and automatically procuring the set of usage right terms based at least in part on the generated URC.

Implementation 22 is a system comprising: a control system including one or more processors; and a memory having stored thereon machine-readable instructions, wherein the control system is coupled to the memory, and the method of any one of Implementations 15 to 21 is implemented when the machine executable instructions in the memory are executed by at least one of the one or more processors of the control system.

Implementation 23 is a system for managing usage rights, the system including a control system configured to implement the method of any one of Implementations 15 to 21.

Implementation 24 is a computer program product comprising instructions which, when executed by a computer, cause the computer to carry out the method of any one of Implementations 15 to 21.

Implementation 25 is the computer program product of Implementation 24, wherein the computer program product is a non-transitory computer readable medium.

What is claimed is:

1. A method comprising: receiving usage rights information associated with a property, wherein the usage rights information includes one or more usage rights terms, wherein each of the one or more usage rights terms is indicative of a permission or restriction associated with the property; determining, for each of the one or more usage rights terms, i) a use category, ii) an action attribute associated with the use category, and iii) a provision attribute associated with the use category and the action attribute, wherein the use category, the action attribute, and the provision attribute together represent at least a portion of the respective permission or restriction associated with the respective usage right term; identifying, for each of the determined usage rights categories, an alphanumeric category code; identifying, for each of the determined action attributes, an alphanumeric action attribute code; identifying, for each of the determined provision attributes, an alphanumeric provision attribute code; generating one or more substring codes based at least in part on the one or more alphanumeric category codes, the one or more alphanumeric action attribute codes, and the one or more alphanumeric provision attribute codes; and generating a usage rights code (URC) for the property based at least in part on each of the one or more substring codes, the URC being representative of the one or more usage rights terms.

2. The method of claim 1, wherein generating the one or more substring codes includes, for each of the determined usage rights categories, one or more alphanumeric category codes, generating a category substring based at least in part on i) the alphanumeric category code associated with the given usage rights category; ii) one or more of the determined action attributes associated with the given usage rights category; and iii) one or more of the determined provision attributes associated with the given action attribute and given usage rights category.

3. The method of claim 1, wherein receiving the usage rights information includes: presenting a selection interface including a plurality of usage right term options; receiving user input associated with selected ones of the plurality of usage right term options; and generating the usage rights information from the selected ones of the plurality of usage right term options.

4. The method of claim 1, further comprising: accessing a database of usage rights contracts associated with the property, wherein each of the usage rights contracts in the database is associated with one or more contract URCs; identifying one or more usage rights contracts from the database of usage rights contracts based at least in part on matching the generated URC with the one or more contract URCs; and outputting an indication of the identified one or more usage rights contract.

5. The method of claim 1, wherein receiving the usage rights specification information includes:
  receiving a contract file; parsing the contract file to identify a plurality of contract terms; and
  determining the usage rights information based at least in part on the identified plurality of contract terms.

6. The method of claim 1, further comprising outputting the generated URC.

7. The method of claim 1, wherein the property is a digital asset, the method further comprising embedding the URC in metadata associated with the digital asset.

8. The method of claim 1, wherein the property is a digital asset, the method further comprising: receiving a payment confirmation, the payment confirmation indicative of a payment transaction associated with procurement of the one or more usage rights terms by a receiving entity; and facilitating transmission of the property to the receiving entity in response to receiving the payment confirmation, wherein facilitating transmission of the property includes facilitating transmission of the URC in association with the property.

9. The method of claim 1, wherein receiving the usage rights information includes receiving geographic information associated with an intended use of the property, and wherein the one or more usage rights terms includes a geographic usage rights term based at least in part on the received geographic information.

10. The method of claim 1, further comprising: accessing one or more databases of obtainable usage right products associated with the property, each usage right product including a respective URC indicating one or more obtainable usage right terms associated with the property; and identifying a set of one or more of the obtainable usage right products based at least in part on a comparison of the generated URC with the respective URCs of the obtainable usage rights products, wherein the identified set of one or more of the obtainable usage right products, when obtained, provides the one or more usage rights terms.

11. A system comprising: a control system including one or more processors; and a memory coupled to the control system, the memory having stored thereon machine-readable instructions, which, when executed by at least one of the one or more processors of the control system, cause the control system to: receive usage rights information associated with a property, wherein the usage rights information includes one or more usage rights terms, wherein each of the one or more usage rights terms is indicative of a permission or restriction associated with the property; determine, for each of the one or more usage rights terms, i) a use category, ii) an action attribute associated with the use category, and iii) a provision attribute associated with the use category and the action attribute, wherein the use category, the action attribute, and the provision attribute together represent at least a portion of the respective permission or restriction associated with the respective usage right term; identify, for each of the determined usage rights categories, an alphanumeric category code; identify, for each of the determined action attributes, an alphanumeric action attribute code; identify, for each of the determined provision attributes, an alphanumeric provision attribute code; generate one or more substring codes based at least in part on the one or more alphanumeric category codes, the one or more alphanumeric action attribute codes, and the one or more alphanumeric provision attribute codes; and generate a usage rights code (URC) for the property based at least in part on each of the one or more substring codes, the URC being representative of the one or more usage rights terms.

* * * * *